(12) United States Patent
Obara et al.

(10) Patent No.: US 7,654,744 B2
(45) Date of Patent: Feb. 2, 2010

(54) FLUID DYNAMIC BEARING MECHANISM FOR A MOTOR

(75) Inventors: Rikuro Obara, Kitasaku-gun (JP); Tadashi Akahori, Kitasaku-gun (JP)

(73) Assignee: Minebea Co., Ltd. (JP)

( * ) Notice: Subject to any disclaimer, the term of this patent is extended or adjusted under 35 U.S.C. 154(b) by 456 days.

(21) Appl. No.: 10/588,418

(22) PCT Filed: Aug. 17, 2004

(86) PCT No.: PCT/US2004/026748
§ 371 (c)(1), (2), (4) Date: Apr. 26, 2007

(87) PCT Pub. No.: WO2005/083280
PCT Pub. Date: Sep. 9, 2005

(65) Prior Publication Data
US 2007/0211971 A1 Sep. 13, 2007

(30) Foreign Application Priority Data
Feb. 9, 2004 (JP) .............................. 2004-031448

(51) Int. Cl.
*F16C 32/06* (2006.01)

(52) U.S. Cl. .................. 384/119; 384/100; 384/107; 384/132

(58) Field of Classification Search ................ 384/100, 384/107, 119, 132
See application file for complete search history.

(56) References Cited

U.S. PATENT DOCUMENTS 5,715,116 A 2/1998 Moritan et al.
6,217,218 B1 4/2001 Inoue et al.

(Continued)

OTHER PUBLICATIONS

International Search Report and Written Opinion of PCT Application No. PCT/US04/026748, date of mailing Jun. 14, 2005, 8 pages total.

*Primary Examiner*—Thomas R Hannon
(74) *Attorney, Agent, or Firm*—Townsend and Townsend and Crew LLP

(57) ABSTRACT

A fluid dynamic bearing mechanism for a motor (1) suitable for use in a hard disk drive and having a compact and thin shape, high bearing rigidity, and high rotating accuracy, and which securely keeps the rotor member (6) in place against shocks, and allows the inspection of lubricant supply amount easily. A fluid dynamic bearing mechanism having a capillary seal part (12) on one end of lubricant supply part formed by a minute gap including dynamic pressure grooves (10) formed on a shaft member (5) or a bearing member (4) is provided. An annular member (13) is fitted on the shaft member at the location corresponding to the capillary seal part, another annular member (14) is fitted on the bearing member at the location corresponding to the capillary seal part, a taper or step (13a, 14a) is formed on the outer peripheral surface of the annular member on the shaft member side and the inner peripheral surface of the annular member on the bearing member side. These inner and outer peripheral surfaces are arranged to be close to and facing with each other so that the rotor member is prevented from disengaging from the bearing member, and the capillary seal part can be formed at the same time. An axial dynamic pressure bearing unit (1) is formed between the annular member on the shaft member side and one end of the bearing member.

92 Claims, 15 Drawing Sheets

U.S. PATENT DOCUMENTS

| | | |
|---|---|---|
| 6,339,515 B2 | 1/2002 | Lee et al. |
| 6,357,916 B2 | 3/2002 | Saeki et al. |
| 6,674,201 B2 | 1/2004 | Liu et al. |
| 2003/0113045 A1 | 6/2003 | Fujinaka |

[Fig.1]
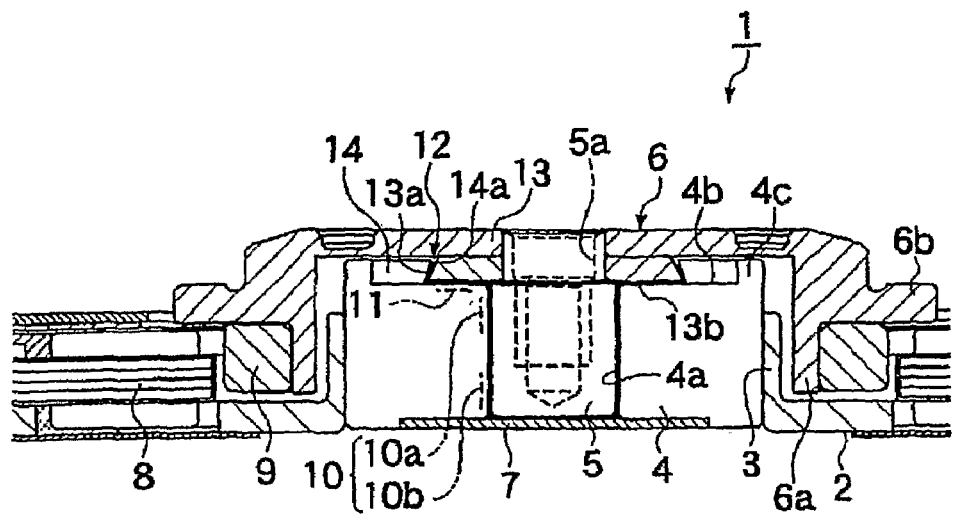
[Fig.2]
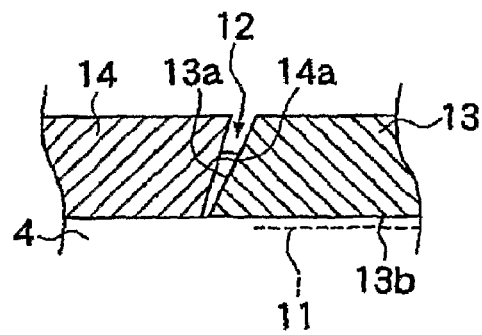
[Fig.3]
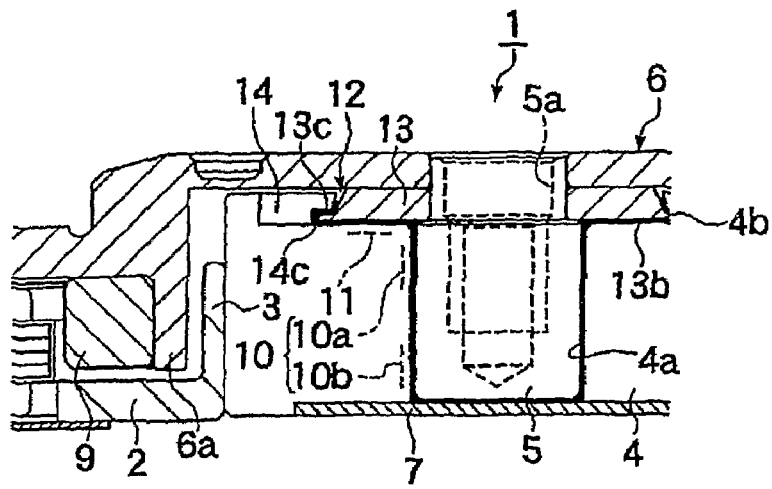

[Fig.4]
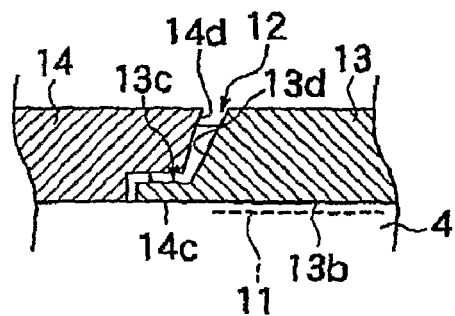
[Fig.5]
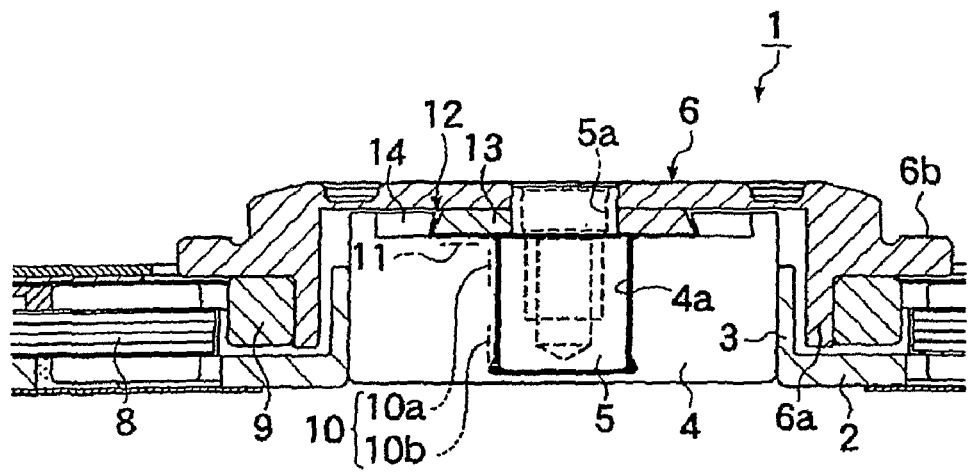
[Fig.6]
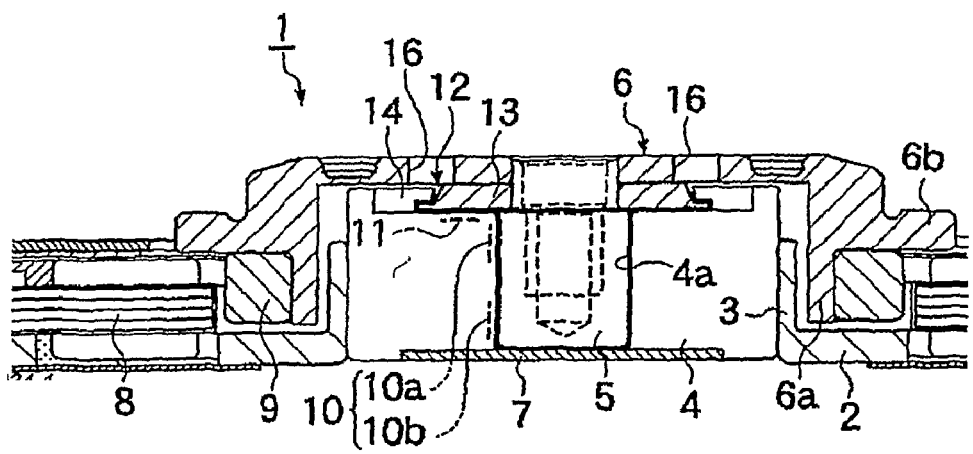

[Fig.7]
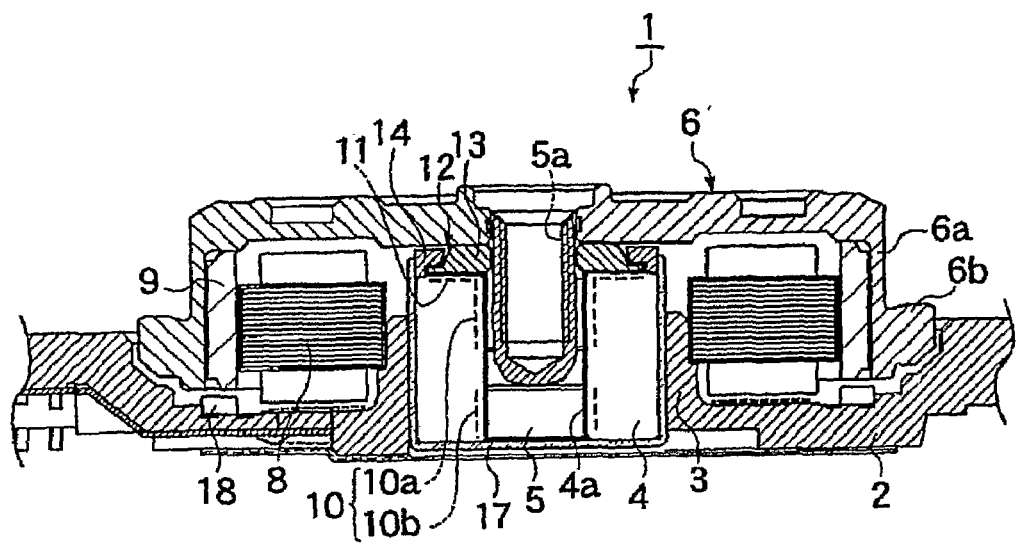
[Fig.8]
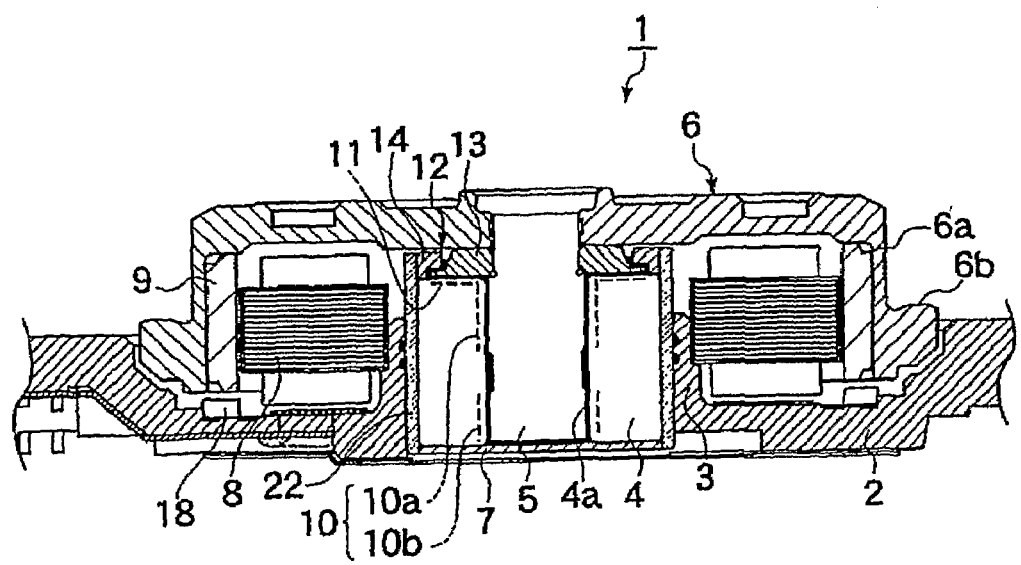

[Fig.9]
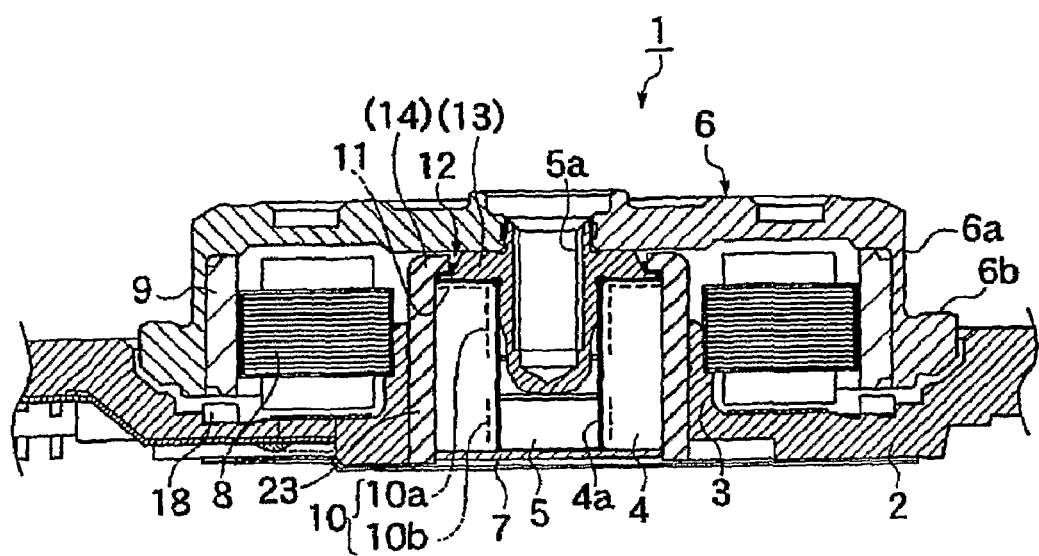
[Fig.10]
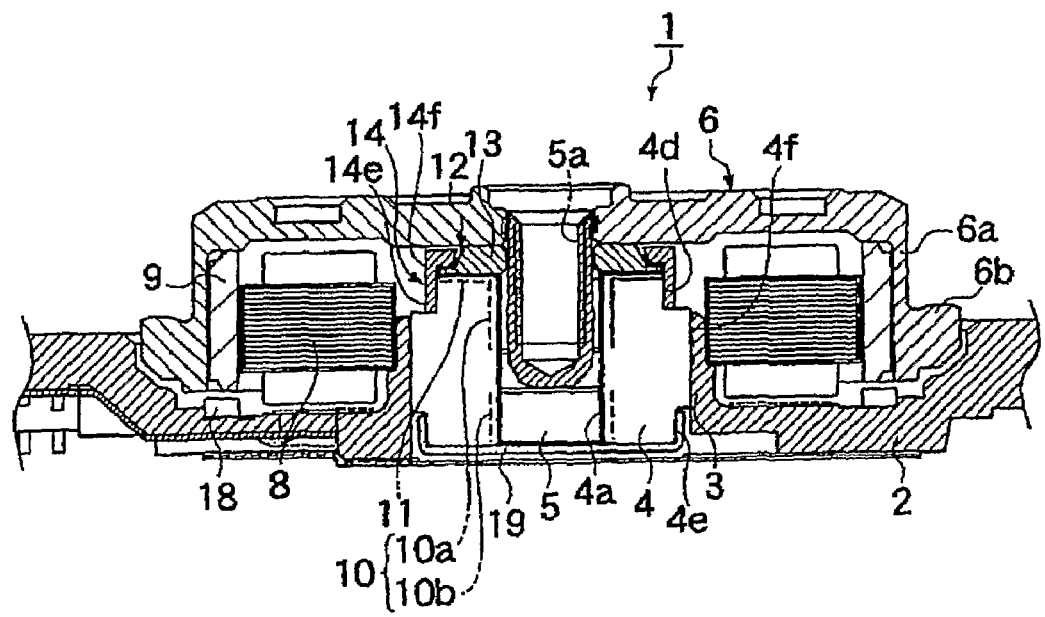

[Fig.11]
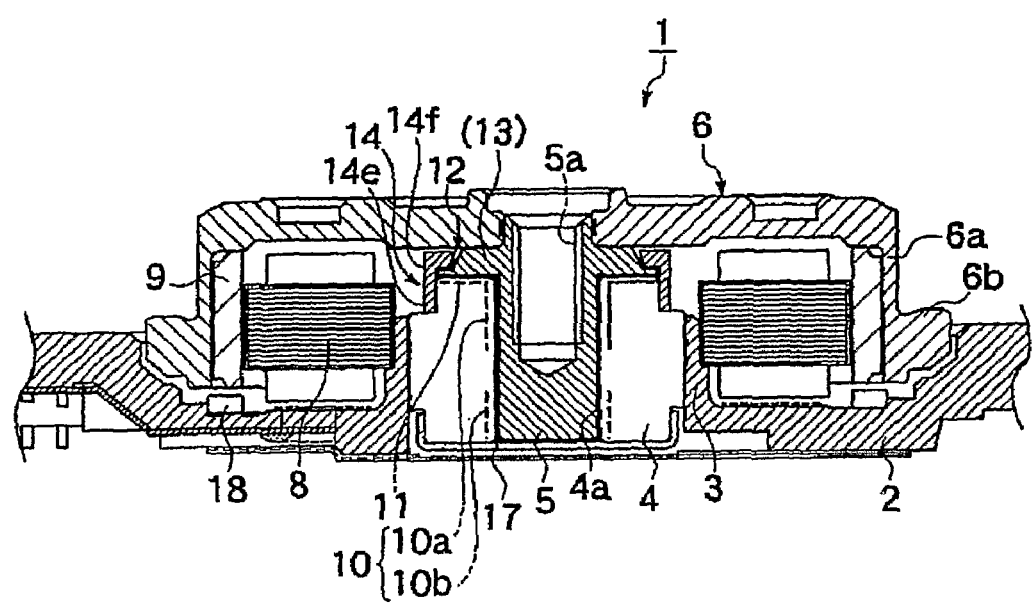

[Fig.12]
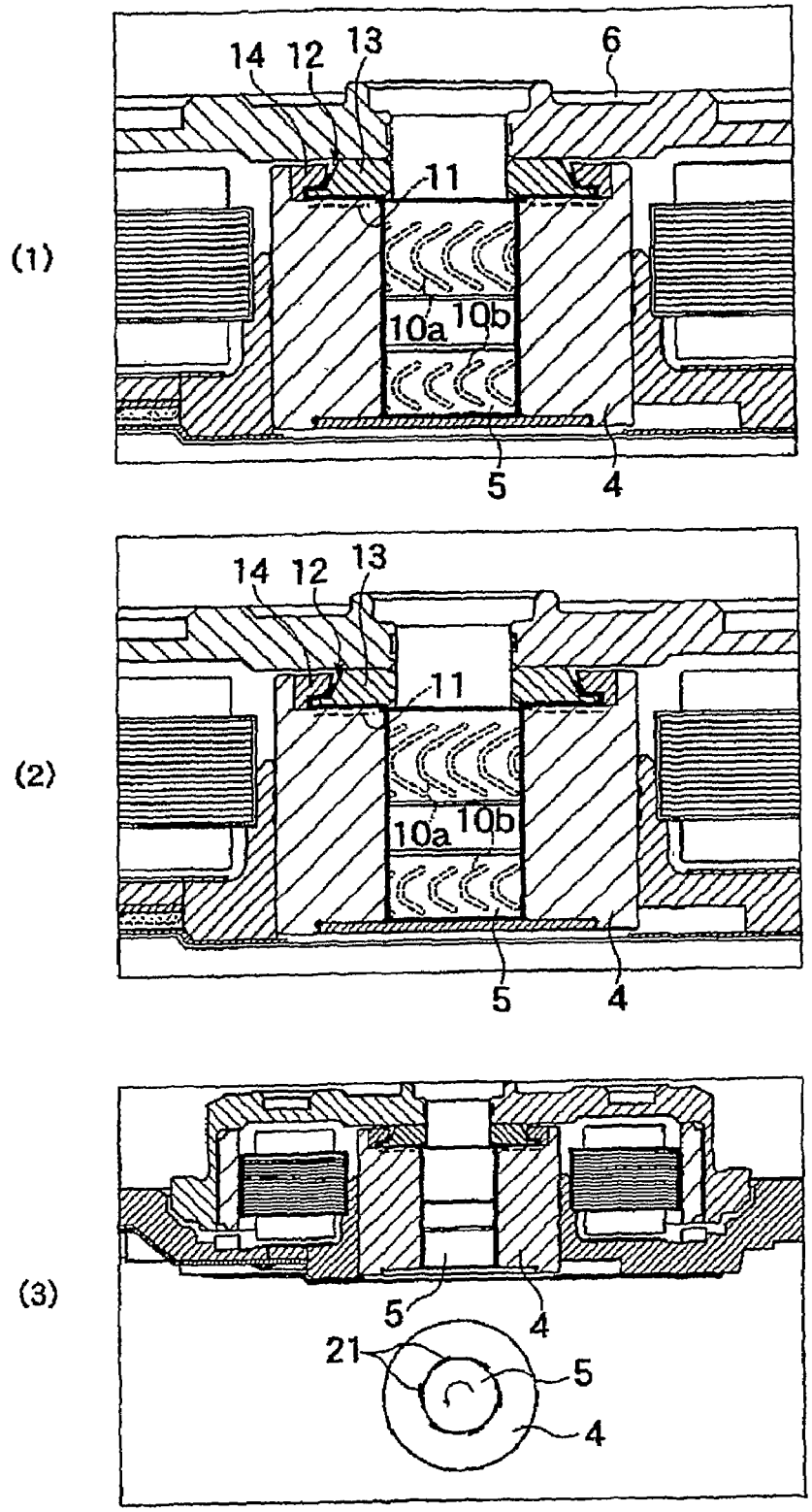

[Fig.13]
(1) 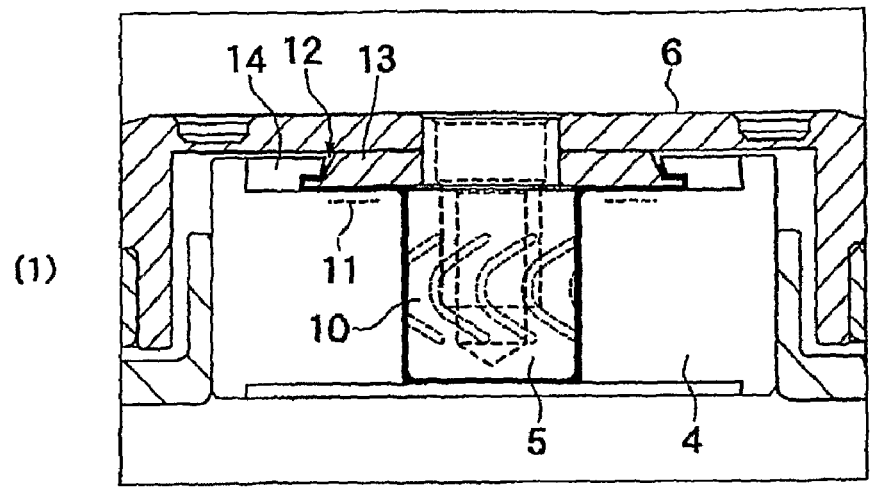
(2) 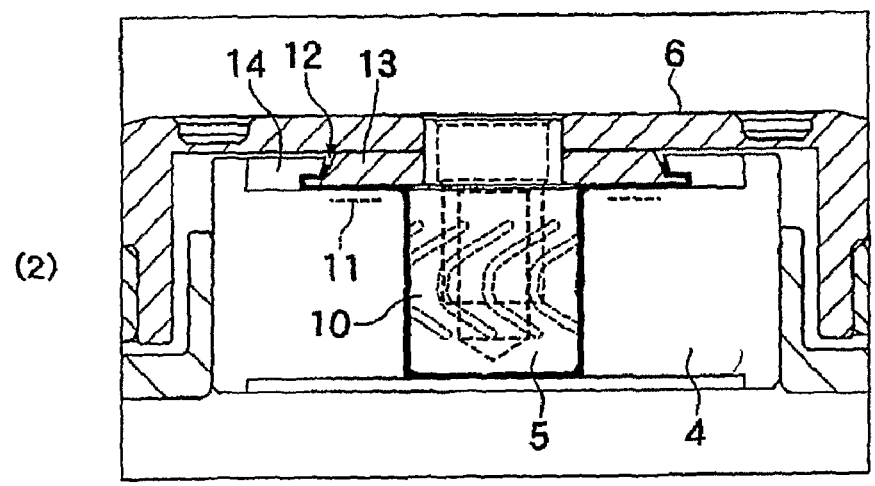
(3) 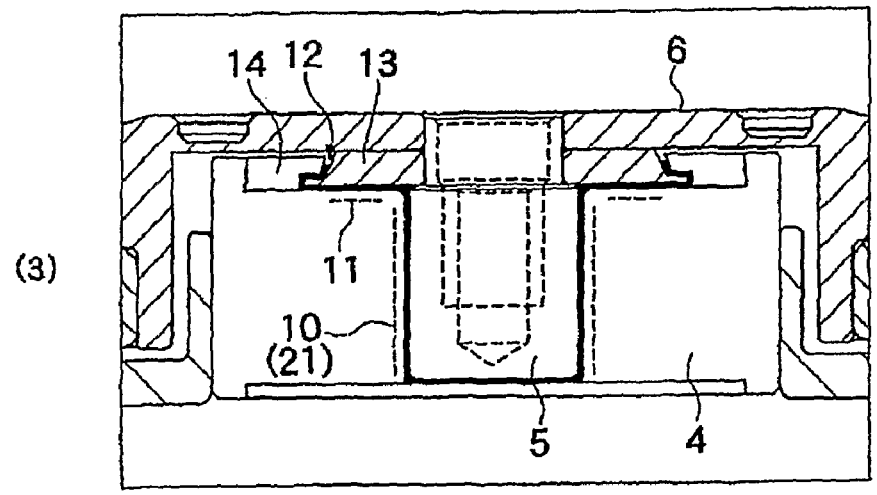

[Fig.14]
(1) 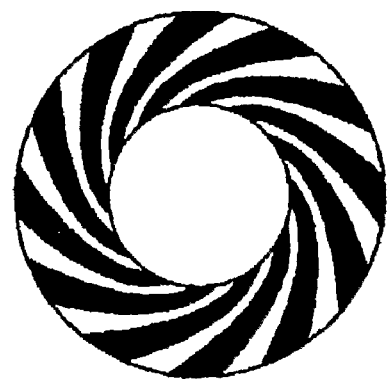
(2) 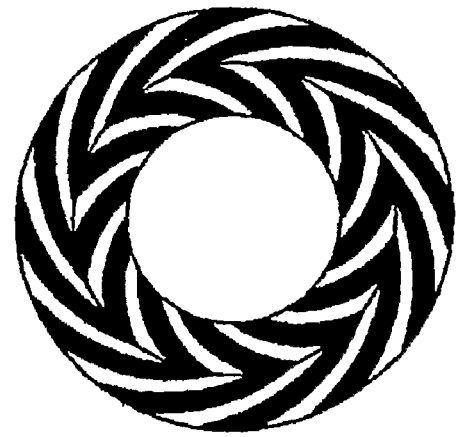
(3) 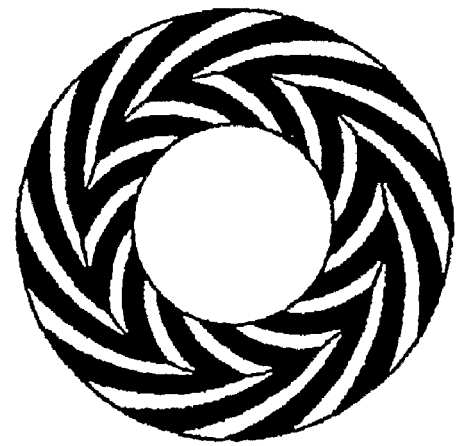

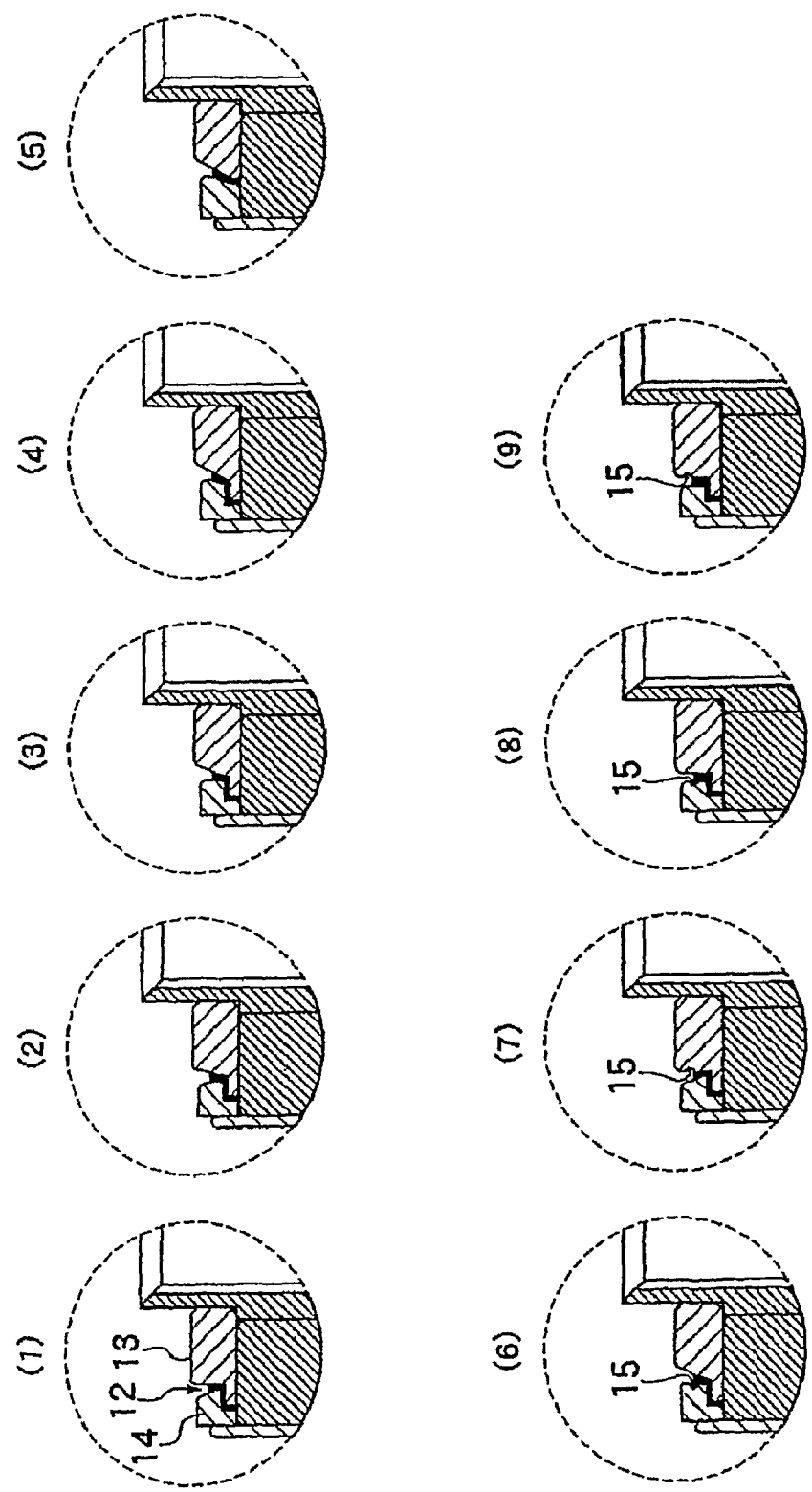
[Fig.15]

[Fig.16]
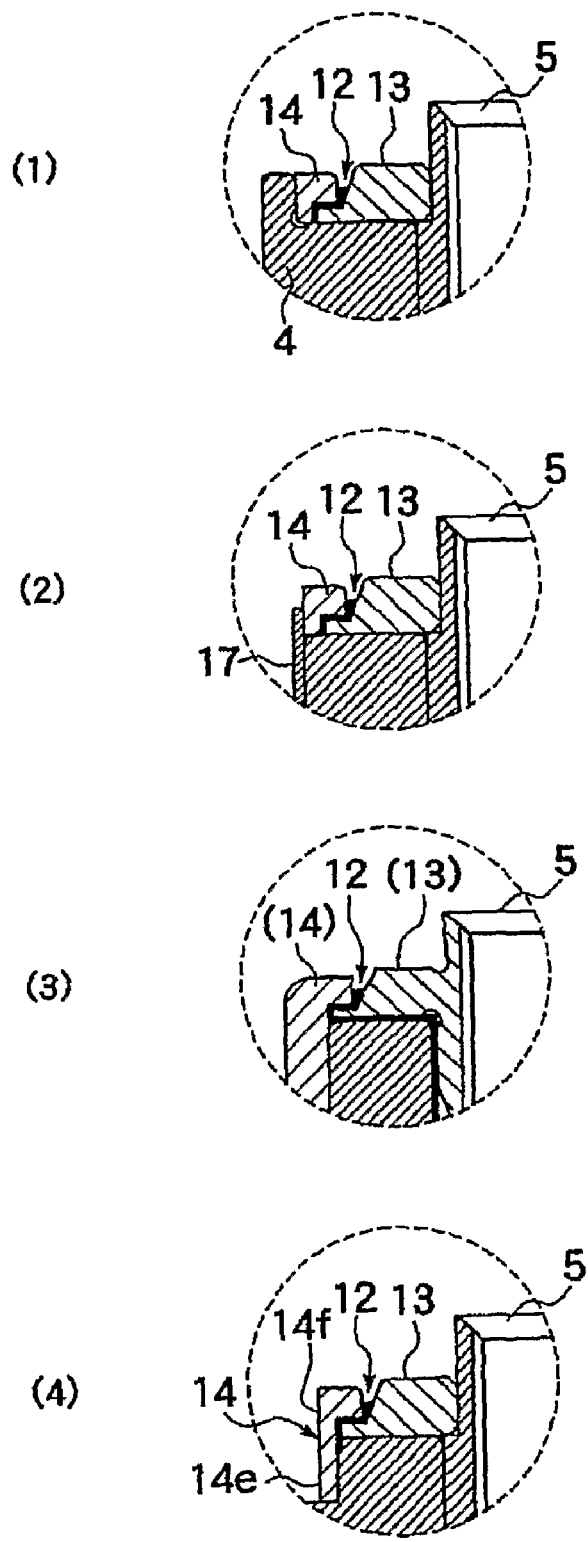

[Fig.17]
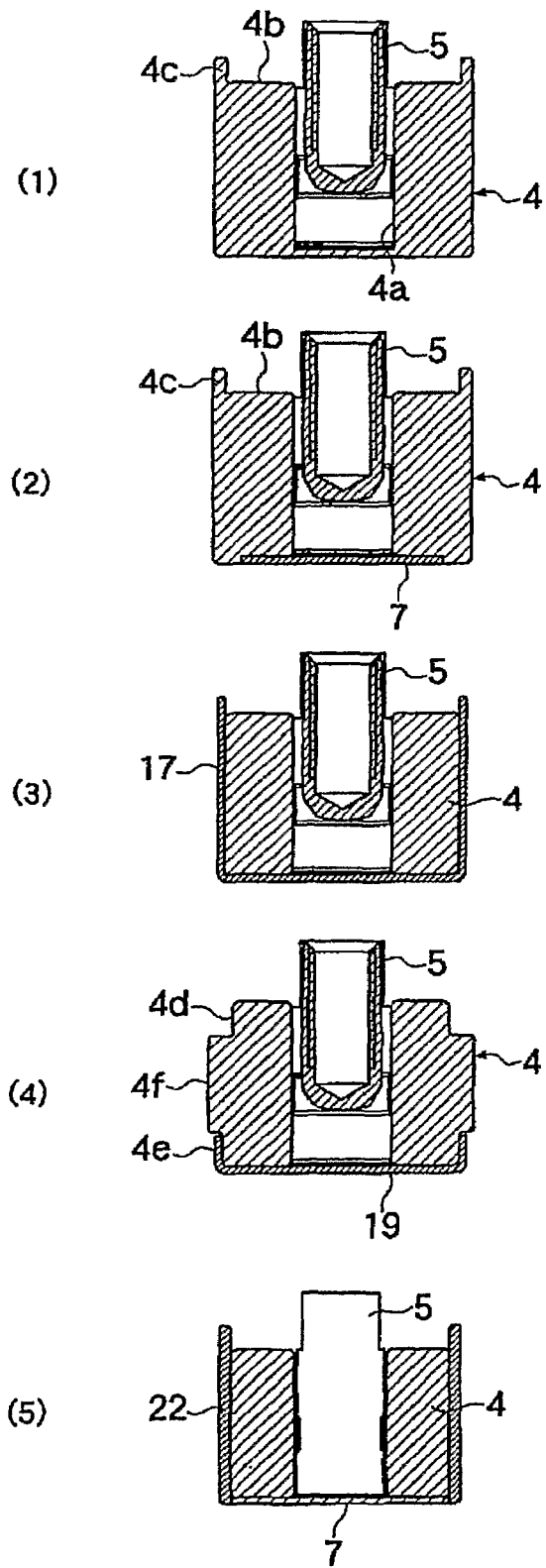

[Fig.18]
(1) 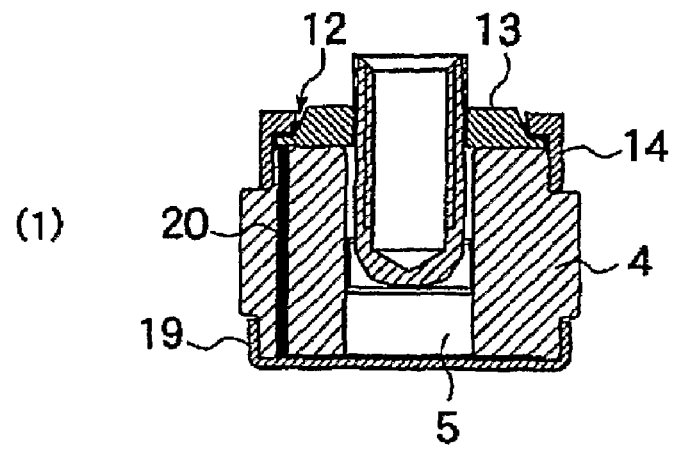
(2) 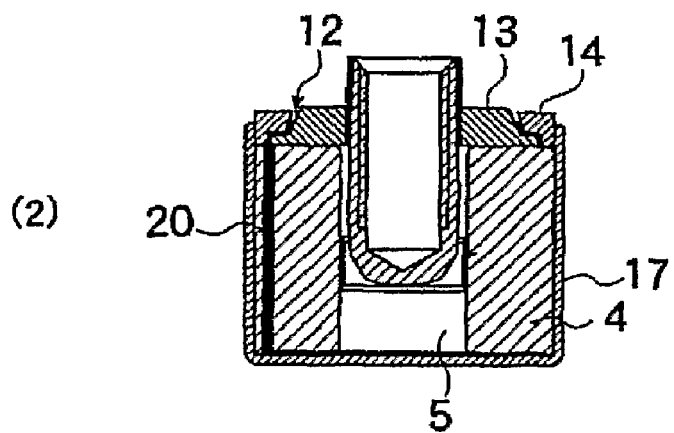
(3) 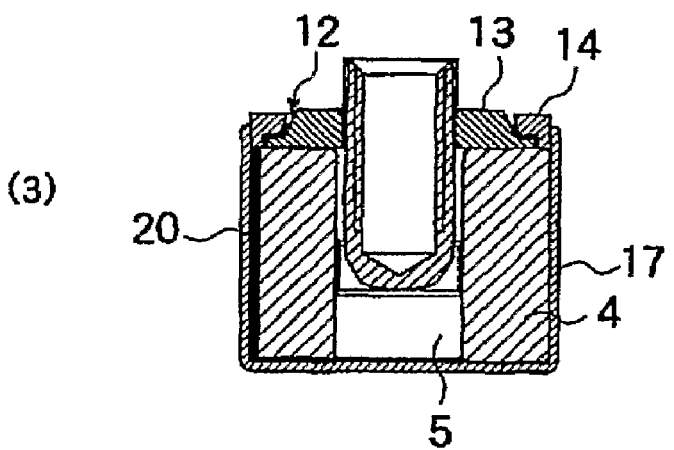

[Fig.19]
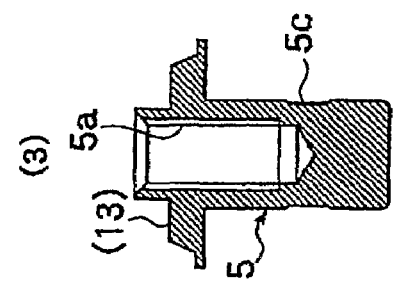
(1)
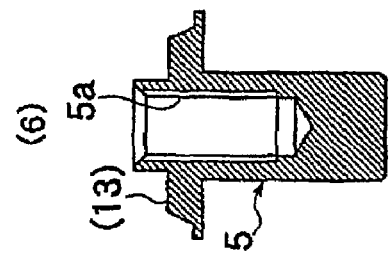
(4)
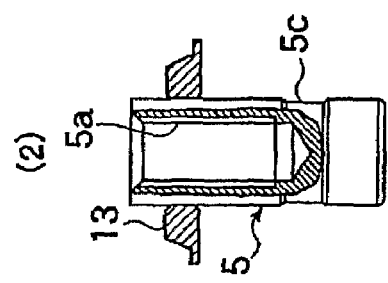
(2)
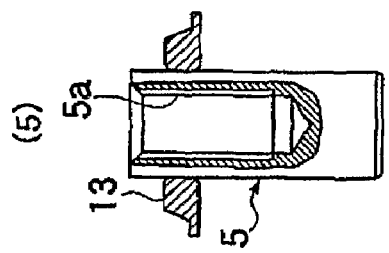
(5)
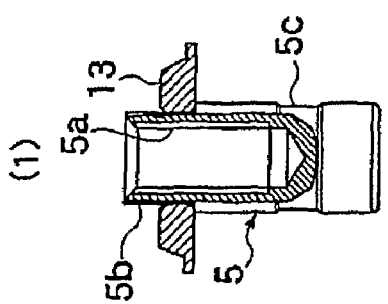
(3)
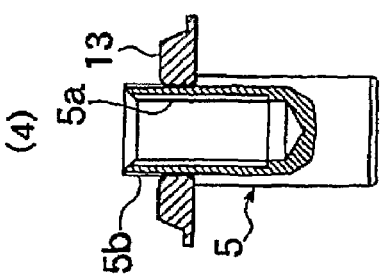
(6)

[Fig.20]

Matrix
Dual radial bearing type

| | (1) | (2) | (3) |
|---|---|---|---|
| Thrust bearing (Axial) | Spiral | Asymmetric | Symmetric |
| Radial bearing upper | Symmetric | Symmetric | Asymmetric |
| Radial bearing lower | Symmetric | Symmetric | Symmetric |

| | (4) | (5) | (6) | (7) |
|---|---|---|---|---|
| | Symmetric | Spiral | Asymmetric | Symmetric |
| | Symmetric | Multi-arc | Multi-arc | Multi-arc |
| | Symmetric | Multi-arc | Multi-arc | Multi-arc |

[Fig.21]

Single radial bearing type

| | (1) | (2) | (3) |
|---|---|---|---|
| Thrust bearing (Axial) | Spiral | Asymmetric | Symmetric |
| Radial bearing | Symmetric | Symmetric | Asymmetric |

| (4) | (5) | (6) | (7) |
|---|---|---|---|
| Symmetric | Spiral | Asymmetric | Symmetric |
| Symmetric | Multi-arc | Multi-arc | Multi-arc |

FLUID DYNAMIC BEARING MECHANISM FOR A MOTOR

BACKGROUND OF THE INVENTION

1. Field of the Invention

The present invention relates to a fluid dynamic bearing mechanism for a motor, in particular, a fluid dynamic bearing mechanism suitable for motors such as small and thin spindle motors, that have an excellent bearing rigidity and rotation accuracy, can securely prevent the rotor member from dislodging under external vibrations and shocks and allows for verification of the amount of lubricant being supplied.

2. Description of Related Art

Hard disk drives in recent years have become smaller and thinner, and begun running faster with the increasing memory capacity of hard disks. Consequently, the fluid dynamic bearing mechanism is required to be more compact and thinner as well as to have higher bearing rigidity, rotating accuracy, and reliability. Therefore, various kinds of improvements have been made in order to respond to those requirements.

For example, Publication of Unexamined Japanese Patent Application 2002-266878 discloses a fluid dynamic bearing mechanism for a motor having a lubricant being continuously supplied into a minute gap formed between a shaft member and a bearing member. A fluid seal part is formed to constitute a capillary structure on at least one end of a lubricant supply part in said minute gap for preventing leakage of said lubricant to outside. A rotating hub is attached on said shaft member at a location outside of said fluid seal part. An annular member is fitted on the shaft member at a location corresponding to the fluid seal part. An extending surface extending in the radial direction as well as an outer peripheral surface continuing axially from said extending surface and the outer edge of said extending surface on one end side in the axial direction of said annular member are arranged close to and facing against an extending surface extending in the radial direction. An inner peripheral surface continuing axially from said extending surface and the outer edge of said extending surface form said fluid sealing part. An extending surface extending in the radial direction on the other end side in the axial direction of said annular member abuts an end surface of the rotating hub to support the rotating hub in the axial direction. A thrust plate is fitted on the shaft member at its end opposite to the position corresponding to the fluid seal part.

Because of its constitution as described above, the bearing disclosed in the above publication has increased lubricant retaining space both in the radial and axial directions due to its fluid sealing part. Moreover, it is possible to view the amount of lubricant filling immediately after filling lubricant through this fluid sealing part, so that it is easier to adjust the amount of filling. Since the extending surface extending in the radial direction on the other end of the annular member in the axial direction abuts an end of the rotating hub, the rotating hub is supported axially so that its resistance against dislodgment as well as ease of machining and assembling are improved.

Furthermore, the invention disclosed by said publication forms a fluid dynamic thrust bearing by virtue of the lubricant filled in the minute gaps formed between both axial end surfaces of the thrust plate and the inner surface of the counter plate. The thrust plate also preventing the entire rotating part including the shaft member and the rotating hub from dislodging from the bearing member.

However, the invention disclosed by said publication is constituted in such a way that said fluid dynamic bearing mechanism cannot be made thinner due to the presence of the thrust plate fitted on the shaft member at the end part opposite to the location corresponding to the lubricant sealing part. Additionally, the axial length of the radial dynamic pressure bearing part is also shortened thus leaving some room for improvement in terms of achieving higher bearing rigidity and rotating accuracy on smaller and thinner fluid dynamic bearing mechanisms.

U.S. Pat. No. 3,155,529 discloses a fluid dynamic bearing mechanism having a thrust dynamic bearing formed by filling lubricant in a minute gap formed between the bottom surface of the upper wall of a rotor hub (rotating hub) and a cylindrical supporting member (bearing sleeve). The shaft is prevented from dislodgment by a ring-shaped member, which is fitted on the tip of the shaft, mating with an annular groove formed on a hollow part (bearing hole) of a supporting member at a location opposing the tip of the shaft.

However, since the bottom surface of the upper wall of the rotor hub is formed as one with the slide surface that constitutes the direct thrust dynamic pressure bearing in this invention, the entire upper wall of the rotor hub needs to be build solidly, thus making it impossible to make the rotor hub thinner in this invention. Moreover, although the thrust plate is omitted, the ring-shaped member provided on the tip of the shaft still prevents the fluid bearing from being made smaller and thinner.

Unexamined Japanese Patent Application 2001-103723 discloses a fluid dynamic bearing for a motor consisting of a stator assembly and a rotor assembly supported rotatably by a radial bearing containing lubricant. An air induction hole is provided in said rotor assembly to allow the outside air to be induced into a negative pressure region generated between said rotor and stator assemblies due to the rotation of the rotor assembly. The air induction hole here is so constituted as to allow it to be used as a hole for filling the lubricant into the fluid dynamic bearing part as well. Moreover, a stop ring is fitted on the tip of the rotating shaft in order to prevent the rotor assembly from dislodging.

Since the bearing disclosed in the above publication can alleviate the negative pressure in the negative pressure region formed between the stator assembly and the rotor assembly when the motor, which is designed flat and thin, is running at a high speed by inducing the outside air into the negative pressure region through the air induction hole, it prevents possible problems such as leakage of the lubricant from the bearing, etc. The air induction hole can also be used as the lubricant filling hole, thereby simplifying the lubricant replenishing operation, which contributes to productivity and realization of a longer motor life. Moreover, the stop ring engages with the lower end of the radial bearing (bearing sleeve), preventing the rotor assembly from dislodging from the stator assembly.

However, the invention disclosed in this publication has no means of increasing the lubricant retaining space. The invention is also indifferent to the prevention of the rotor hub that constitutes the rotor assembly from dislodging as well as to the ease of machining and assembling of components. Furthermore, since the thrust bearing is protruding outward from the frame's constraint (base member), there is still room for improvement in terms of making the fluid dynamic bearing mechanism thinner and flatter.

SUMMARY OF THE INVENTION

The object of the present invention is to solve the above mentioned problems and provide a fluid dynamic bearing mechanism for a motor that can be built smaller and thinner, achieve a high bearing rigidity and rotating accuracy built into a thinner motor, protect the rotor member from external vibrations and shocks, and allow maintenance personnel to easily check the amount of the lubricant. Such motor being suitable for use in a hard disk drive.

In a fluid dynamic bearing mechanism for a motor, wherein a lubricant is continuously supplied into a minute gap formed between a shaft member and a bearing member installed relatively rotatably. The minute gap includes dynamic pressure grooves, and a capillary seal part is formed on one end of a lubricant supply part in said minute gap to prevent leakage of said lubricant to the outside. An annular member is fitted on said shaft member at a location corresponding to said capillary seal part on said shaft member side. An annular member on the bearing member side is provided to fit in one end surface of a recessed part of said bearing member at a location corresponding to said capillary seal part on said bearing member side. A taper or step is formed on the outer periphery of said annular member on the shaft member side thus reducing its diameter as it advances axially toward an end. A taper or step is formed on the inner periphery of said annular member on the bearing member side thus reducing its diameter as it advances axially toward an end. The outer periphery surface of said annular member on the shaft member side and the inner periphery surface of said annular member on the bearing member side are arranged close to each other in the axial and radial directions thus preventing said shaft member and a rotor member affixed on said shaft member from disengaging from said bearing member and also forming said capillary seal part. Dynamic pressure grooves are formed either on the outer periphery surface of said shaft member or the inner periphery surface of said bearing member for generating a dynamic pressure to support a radial load. Dynamic pressure grooves are formed either on a radial extending surface in the axial direction on one side of said annular member on the shaft member side or one end surface of said bearing member opposing said extending surface to generate a dynamic pressure to support an axial load.

The annular member on the shaft side is made of hardened steel and is abutted on an end surface of the rotor member in order to support the rotor member in the axial direction. A plurality of lubricant filling ports is formed evenly spaced on the periphery of the rotor member at the location where it faces the capillary seal part in the axial direction.

Further features and advantages will appear more clearly on a reading of the detailed description, which is given below by way of example only and with reference to the accompanying drawings wherein corresponding reference characters on different drawings indicate corresponding parts.

BRIEF DESCRIPTION OF THE DRAWINGS

FIG. 1 is a vertical cross section of the motor of the first embodiment.

FIG. 2 is a partially enlarged view of FIG. 1.

FIG. 3 is a vertical cross section of the motor of the second embodiment.

FIG. 4 is a partially enlarged view of FIG. 3.

FIG. 5 is a vertical cross section of the motor of the third embodiment.

FIG. 6 is a vertical cross section of the motor of the fifth embodiment.

FIG. 7 is a vertical cross section of the motor of the sixth embodiment.

FIG. 8 is a vertical cross section of the motor of the seventh embodiment.

FIG. 9 is a vertical cross section of the motor of the eighth embodiment.

FIG. 10 is a vertical cross section of the motor of the ninth embodiment.

FIG. 11 is a vertical cross section of the motor of the tenth embodiment.

FIG. 12 is a diagram showing various embodiments of the radial dynamic pressure bearing when the radial dynamic pressure bearing is formed in two locations in the axial direction.

FIG. 13 is a diagram showing various embodiments of the radial dynamic pressure bearing when the radial dynamic pressure bearing is formed in a single location in the axial direction.

FIG. 14 is a diagram showing various embodiments of dynamic pressure grooves for the axial dynamic pressure bearing.

FIG. 15 is a diagram showing various embodiments of the capillary seal.

FIG. 16 is a diagram showing various embodiments of the annular member on the bearing member side.

FIG. 17 is a diagram of various embodiments of the structure for blocking the open end of the bearing hole of the bearing member.

FIG. 18 is a vertical cross section of the fluid dynamic bearing mechanism for a motor of the eleventh embodiment.

FIG. 19 is a diagram showing various embodiments of the shaft member.

FIG. 20 is a table showing various combinations of various shapes of dynamic pressure grooves for radial and axial dynamic pressure bearings when the radial dynamic pressure bearing is provided at two locations in the axial direction.

FIG. 21 is a table showing various combinations of various shapes of dynamic pressure grooves for radial and axial dynamic pressure bearings when the radial dynamic pressure bearing is provided at only one location in the axial direction.

DETAILED DESCRIPTION OF THE INVENTION

The first embodiment (Embodiment 1) of the present invention will be described below.

EMBODIMENT 1

FIG. 1 is a vertical cross section of a motor 1 of Embodiment 1 and FIG. 2 is an enlarged view of a portion of FIG. 1. In Embodiment 1, the motor 1 is a spindle motor used to drive a hard disk drive. A cylindrical bearing holding member 3 provided vertically in the center of a base member 2 has mounted in it a cylindrical sleeve that forms a bearing member 4 of a fluid dynamic bearing mechanism. A bearing hole 4*a* formed in the center of the bearing member (sleeve) 4 rotatably supports a shaft member (shaft) 5 that functions as the rotating shaft.

An upper-direction reduced diameter end of shaft member 5 is fitted with a rotor member (rotor hub) 6 that rotates carrying a disk (not shown). The disk is mounted on the surface of a flange part 6*b* of rotor member 6 and is affixed on rotor member 6 by means of a clamp member (not shown). A screw hole 5*a* is formed on an end of shaft member 5 for fastening the clamp member and the rotor member 6 onto the shaft member 5 by a screw. An open end of the bearing hole 4*a* of bearing member 4 is closed by a cover plate 7.

Stator 8 is affixed to the base member 2 on the outside of cylindrical bearing holding part 3 in the radial direction. A rotor magnet 9 is affixed on the outer periphery of a cylindrical member 6*a* of rotor member 6 facing the inside of stator 8. A small gap is formed between the stator 8 and the rotor magnet 9. The cylindrical part 6*a* also faces the cylindrical bearing holding part 3 in the radial direction. A small gap is also formed between the cylindrical part 6a and the cylindrical bearing holding part 3. Thus, the motor 1 forms an inner rotor type motor.

A lubricant is filled continuously in a minute gap that includes a radial dynamic pressure bearing part 10 formed between shaft member 5 and bearing member 4 and a minute gap formed between the end surface of the bottom end surface in FIG. 1 of shaft member 5 and a cover plate 7. At the upper end in FIG. 1 is formed a lubricant filling part in the minute gaps, and a capillary seal part (fluid sealing part) 12 to prevent leakage of the lubricant to the outside. The capillary seal part 12 connects with said lubricant filling parts via an axial dynamic bearing part 11 to be described later. Radial dynamic pressure bearing part 10 is formed in two locations in the axial direction as shown by symbols 10a and 10b in FIG. 1.

An annular member on shaft member side 13 is fitted on the reduced diameter end of shaft member 5 at a location that corresponds to the capillary seal part 12 by means of press fitting, gluing or a combination of these or welding in such a way as to abut the bottom end (in FIG. 1) of rotor member 6. An annular member on bearing side 14 is fitted on a recessed part 4b formed on one end of the bearing member 4 at a location that corresponds to capillary seal part 12 by means of press fitting, gluing or a combination of these or welding. Although the annular member on shaft member side 13 is substantially smaller in diameter compared to the external dimension of rotor member 6, it supports the area of rotor 6 for a substantial distance and thereby support the thin ceiling part of the rotor member 6. The annular member on bearing member side 14 is preferably welded to a circumference wall 4c of recessed part 4b.

A taper 13a is formed on the outer periphery of annular member on shaft member side 13. A taper 14a is formed on the inner periphery surface of annular member on bearing member side 14. The outer periphery surface of annular member on shaft member side 13 and the inner periphery surface of annular member on bearing member side 14 are arranged close to each other in the axial and radial directions thereby forming the capillary seal part 12 that connects with the aforementioned lubricant filling part. Also, causing tapers 13a and 14a to be arranged close to each other in the axial and radial directions prevents the shaft member 5 and the rotor member 6 affixed on the shaft member 5 from disengaging from the bearing member 4. The radial gap between the two tapers 13a and 14a should preferably be wider as it advances toward one end in the axial direction as shown in FIG. 1, FIG. 2 and FIG. 15 (5).

In radial dynamic bearing part 10 (10a, 10b), dynamic pressure grooves are formed on either the outer periphery surface of shaft member 5 or the inner periphery surface of bearing member 4 in order to generate dynamic pressure to support the load in the radial direction. Another dynamic pressure groove is formed on either an extending surface 13b extending in the radial direction and on the bottom side of the (bottom side in FIG. 1) annular member on shaft member side 13 or the surface of bearing member 4 that faces said extending surface 13b in order to generate a dynamic pressure to support the load in the axial direction. The lubricant is filled in the area where the dynamic pressure groove is formed and this area is located between extending surface 13b and the facing surface of the bearing member 4 to support the axial direction load, thus forming an axial (thrust) dynamic pressure bearing part 11.

Therefore, when the motor 1 starts to rotate as the stator 8 is powered, the shaft member 5 starts rotating without contacting the bearing hole 4a, the shaft member 5 being supported in the radial direction by the dynamic pressure generated in the radial dynamic pressure bearing part 10 (10a, 10b). The annular member on shaft member side 13 fitted on the shaft member 5 rotates without contacting the bearing member 4 being supported in the axial direction by the dynamic pressure generated in the axial dynamic bearing part 11. The cover plate 7 is formed thin as it does not receive any load in the axial direction.

Embodiment 1, constituted as described above, provides the following effects.

The third dynamic bearing of Embodiment 1 prevents the shaft member 5 and the rotor member 6 from disengaging from the bearing member 4 due to external vibrations and shocks. Embodiment 1 also provides the axial dynamic pressure being part 11 as well as the capillary seal part 12 for the prevention of leakage of the lubricant to the outside by means of the combination of three members, i.e., the annular member on shaft member side 13, the annular member on bearing member side 14, and the bearing member 4. Embodiment 1 does not require a ring-shaped disengagement preventing member or a thrust plate (counter plate) to be fitted on the shaft member 5 to prevent disengagement of the shaft member 5 from the bearing member 4.

Consequently, the present invention makes it possible to make the fluid dynamic bearing mechanism smaller and thinner, while providing a relatively long straight portion for shaft member 5 and a relatively long axial length for radial dynamic pressure bearing part 10 (10a, 10b) in this smaller and thinner fluid bearing. Thus high bearing rigidity and rotation accuracy is achieved.

Since the annular member on bearing member side 14 is welded to the peripheral wall 4c of recessed part 4b, the affixing strength of the annular member on bearing member side 14 is enhanced and is capable of securely preventing the shaft member 5 and the rotor member 6 from disengagement from the bearing member 4 due to external vibrations and shocks.

Moreover, when the radial gap between the two tapers 13a and 14a increases as it advances toward an end in the axial direction, the lubricant retaining space is increased, which alleviates the lubricant boundary surface fluctuations in capillary seal part 12, thus preventing the lubricant from leaking outside.

EMBODIMENT 2

The second embodiment (Embodiment 2) of the present invention will be described below.

FIG. 3 is a vertical cross section of a motor 1 of Embodiment 2 and FIG. 4 is an enlarged view of a portion of FIG. 3. In Embodiment 2, the structure of the capillary seal part 12 of motor 1 is different from that in Embodiment 1. In Embodiment 2, a step 13c is provided in place of the taper 13a, and a step 14c is provided in place of the taper 14a.

These steps 13c and 14c are steps formed on the outer periphery surface of annular member on shaft member side 13 and the inner periphery surface of annular member on bearing member side 14 in the inward radial direction. Normally only one step is formed on these surfaces. The radial gap between a one half outer periphery surface portion 13d on one end in the axial direction of the step 13c (upper side in FIG. 3) and a one half inner periphery surface portion 14d on one end in the axial direction of the step 14c can be arranged either to increase as it advances toward one end in the axial direction as shown in FIGS. 15 (1) through (4), (6) and (7) or held constant as shown in FIGS. 15 (8) and (9). In either case, an annular groove 15 that alleviates lubricant boundary surface fluctuations in the fluid seal part 12 is formed (see FIGS. 15 (6) through (9)).

As FIGS. 15 (1) through (4), (6) and (7) indicate that there can be various forms of the gap that constitutes the radial gap between the one half outer periphery surface portion 13d and the one half inner periphery surface portion 14d. The gap increases as it advances towards one end of the shaft by using combination of the slanting of the one half outer periphery surface portion 13d and the slanting of the one half outer periphery surface portion 14d. FIGS. 15 (1) and (7) show cases where only the one half inner periphery surface portion 14d is made to increase its diameter as it advances toward the end in the axial direction. FIGS. 15 (3) and (6) show cases where only the one half outer periphery surface portion 13d is made to decrease its diameter as it advances toward the end in the axial direction. FIG. 15 (2) shows a case where the above two cases are combined, and FIG. 15 (4) shows a case where both the one half outer periphery surface portion 13d and the one half inner periphery surface portion 14d are made to reduce their diameters as they advance toward the end in the axial direction.

The other half outer periphery surface portion of step 13c on the other end in the axial direction (lower side in FIG. 3) and the other half inner periphery surface portion of step 14c on the other end in the axial direction are formed along the axial direction facing each other across a minute gap. This minute gap connects with the axial dynamic pressure bearing 11.

Although Embodiment 2 differs from Embodiment 1 in the above points, there is no other difference so that detailed descriptions are omitted here.

Embodiment 2, constituted as described above, provides the following effects.

The bearing of Embodiment 2 can be constituted in such a way as to allow a vertical play of the annular member on shaft member side 13. The vertical play can be easily adjusted by forming the step 13c on the outer periphery surface of annular member on shaft member side 13, and the step 14c on inner periphery surface of annular member on bearing side 14, and arranging the outer periphery surface of annular member on shaft member side 13 and the inner periphery surface of annular member on bearing side 14 to be close to each other in the axial and radial directions and face with each other.

Moreover, if the step 13c and step 14c are arranged in such a way that the radial gap between the one half outer periphery surface portion 13d and the one half inner periphery surface portion 14d increases as it advances toward the end in the axial direction, the lubricant retaining space can be increased to alleviate lubricant boundary surface fluctuations in the capillary seal part 12, and thereby preventing the lubricant from leaking outside. If an annular groove 15 is formed on either the one half outer periphery surface portion 13d or the one half inner periphery surface portion 14d in order to alleviate lubricant boundary surface fluctuations in capillary seal part 12, the abovementioned effect can be further enhanced.

In addition, the invention of Embodiment 2 can achieve all the effects achieved by the invention of Embodiment 1.

EMBODIMENT 3

The third embodiment (Embodiment 3) of the present invention will be described below.

FIG. 5 is a vertical cross section of a motor 1 of Embodiment 3. In Embodiment 3, a bearing member 4 and a cover plate 7 that blocks the open end of a bearing hole 4a of the bearing member 4 are made of the same material as an integral part so that the cover plate 7 is not an independent part. Other than that, it is identical to Embodiment 1.

The construction of Embodiment 3 prevents the leakage of lubricant from the lubricant filling part to the outside almost completely except for the possibility of a slight leakage via the capillary seal part 12. Also, it simplifies the construction of the bearing member 4, reduces the number of components, and can reduce the assembly man-hours.

The integral structure of the cover plate 7 and bearing member 4 in Embodiment 3 can be applied to all other embodiments that use a cover plate.

EMBODIMENT 4

The fourth embodiment (Embodiment 4) of the present invention will be described below.

In Embodiment 4, the annular member on shaft member side 13 in Embodiment 1 is made of quenched steel and supports the rotor member 6 by abutting the end surface of rotor member 6. Other than that, it is identical to Embodiment 1.

The construction of Embodiment 4 prevents deformation of the rotor member 6 when a disk is mounted on and clamped on the rotor member 6. The wall thickness of rotor member 6 is thin as it is used in a small and thin motor 1, but because the rotor member 6 is firmly supported in the axial direction by the hardened annular member on shaft member side 13 it does not deform.

The material of the annular member on shaft member side 13 used in Embodiment 4 can be applied to all other embodiments where the annular member on shaft member side 13 is used.

EMBODIMENT 5

The fifth embodiment (Embodiment 5) of the present invention will be described below.

FIG. 6 is a vertical cross section of a motor 1 of Embodiment 5. In Embodiment 5, a plurality of lubricant filling ports 16 are formed on and to go through the periphery of rotor member 6 in the area facing capillary seal part 12. Other than that, it is identical to Embodiment 2.

The construction of Embodiment 5 allows the filling amount of the lubricant to be easily checked by visually checking the boundary of the lubricant even after the motor is a completed product. It is also possible to add the lubricant through the lubricant filling ports 16, so that the quality control of the motor 1 can be performed more easily. The lubricant filling ports 16 formed on the periphery of rotor member 6 are evenly spaced so that the rotary balance of the rotor member 6 is not affected by the presence of the filling parts.

The lubricant filling ports 16 of Embodiment 5 can be applied to all other embodiments having the capillary seal part 12.

EMBODIMENT 6

The sixth embodiment (Embodiment 6) of the present invention will be described below.

FIG. 7 is a vertical cross section of a motor 1 of Embodiment 6. In Embodiment 6, the annular member on bearing member side 14 abuts an end of bearing member 4 in the axial direction, and a cap-shaped cylindrical member with a bottom 17 is provided to cover the bearing member 4 and the annular member on bearing member side 14. The annular member on bearing member side 14 is fitted on the inner periphery of the opening of cylindrical member with a bottom 17 by means of a combination of press fitting and welding or a combination of press-fitting and gluing.

The stator 8 of Embodiment 6 is different from the inner rotor type of Embodiments. The stator 8 is located inside, in the radial direction, relative to the rotor magnet 9, and is fitted on the cylindrical bearing holding part 3. The cylindrical bearing holding part 3 is sandwiched between the stator 8 and the cylindrical member with a bottom 17. Moreover, the rotor magnet 9 is affixed on the inner peripheral surface of cylindrical part 6a of the rotor member 6, which is different from the inner rotor type Embodiment 1. Thus, motor 1 of Embodiment 6 forms an outer rotor type motor. The fitting of the cylindrical member with a bottom 17 to the cylindrical bearing holding part 3 should preferably be done using a thermosetting glue so that there would not be any gap between them.

An annular suction plate 18 is affixed on the surface of base member 2 and below the rotor magnet 9, leaving a small gap from the end of rotor magnet 9. The suction plate 18 pulls entire rotor in the axial direction by attracting the rotor magnet 9. The resultant force for the entire rotor combination is the sum of the gravity and the magnetic attraction in the axial direction and balances with the dynamic pressure generated by the axial dynamic bearing part 11. Since the forces acting on the shaft member 5 and annular member on the shaft member side 13 are in balance, the shaft member 5 and the annular member on shaft member side 13 rotate without contacting the bottom of recess part 4b of bearing member 4.

Although there are some other differences in shapes and structures, Embodiment 6 is not essentially similar to Embodiment 1.

Since Embodiment 6 is constituted as such, the lubricant leaking from the lubricant filling part to the outside is almost completely prevented by the cap-shaped cylindrical member with a bottom 17. This also makes it possible to manufacture the cylindrical member with a bottom 17 and the annular member on bearing member side 14 by press work thereby reducing the manufacturing cost of motor 1.

In addition, the invention of Embodiment 6 can achieve all the effects achieved by the invention of Embodiment 1.

EMBODIMENT 7

The seventh embodiment (Embodiment 7) of the present invention will be described below.

FIG. 8 is a vertical cross section of a motor 1 of Embodiment 7. In Embodiment 7, a cylindrical member 22 is provided to cover the bearing member 4 and the annular member on bearing member side 14 from the outside in the radial direction. The annular member on bearing member side 14 is fitted on the opening of cylindrical member 22 on an end in the axial direction (upper side in FIG. 8), and a cover plate 7 is fitted on the opening of cylindrical member 22 on the other end in the axial direction (lower side in FIG. 8) to block the open end side of bearing hole 4a of bearing member 4. The cover plate 7 has a diameter larger than that of the cover plate 7 used in Embodiment 1. In comparison with Embodiment 6, Embodiment 7 is equivalent to a case where the bottom wall of cylindrical member with a bottom 17 of Embodiment 6 is removed and replaced with the cover plate 7, which is now a separate component.

Since Embodiment 7 is constituted as such, it is possible to configure the cylindrical member 22, the annular member on bearing member side 14, and the cover plate 7 in shapes that can be manufactured by press work, and cause the bearing member 4 and the cylindrical member 22 to have simpler structures, and thereby to reduce the motor manufacturing cost.

In addition, the invention of Embodiment 7 can achieve all the effects achieved by the invention of Embodiment 1.

EMBODIMENT 8

The eighth embodiment (Embodiment 8) of the present invention will be described below.

FIG. 9 is a vertical cross section of a motor 1 of Embodiment 8. In Embodiment 8, the annular member on the bearing member side 14 and the cylindrical part 22 of Embodiment 7 are made as an integral part made from one material. Also, in Embodiment 8, the annular member on the shaft member side 13 and shaft member 5 of Embodiment 7 are made an integral part made from one material. A new flanged cylindrical part manufactured in such a manner is identified with symbol 23. A flange portion 23a on one end in the axial direction (upper side in FIG. 11) of the flanged cylindrical member 23 functions similar to the annular member on bearing member side 14 and forms the capillary seal part 12.

In this flanged cylindrical member 23, the wall thickness except the flange portion 23a is made slightly thicker as compared to the same in Embodiment 7. However, it is also possible to manufacture the flanged cylindrical member 23 having the same shapes as that of the annular member on bearing member side 14 and cylindrical part 22 in Embodiment 7, and using a single material. Other than that, the flanged cylindrical member 23 is identical to Embodiment 7.

Since Embodiment 8 is constituted as such, it uses a smaller number of components, and thus can reduce the man-hours required for assembly. Furthermore, since the manufacture of the part that corresponds to annular member on the bearing member side 14 and the part that corresponds to cylindrical member 22 can be done by press work, the manufacturing cost of the motor can be reduced.

EMBODIMENT 9

The ninth embodiment (Embodiment 9) of the present invention will be described below.

FIG. 10 is a vertical cross section of a motor 1 of Embodiment 9. In Embodiment 9, an annular member with a sleeve on the bearing member side 14a forms the capillary seal part 12, and a sleeve part 14e of said annular member with a sleeve on bearing member side 14a is fitted on a reduced diameter end 4d of bearing member 4 by press-fitting, gluing, or the combination of them, or welding, and an annular part 14f faces annular member on shaft member side 13.

The outer periphery surface of the annular member on shaft member side 13 and the inner periphery of annular part 14f of annular member with a sleeve on bearing member side 14a are arranged to face with and be close to each other in the axial and radial directions, thus preventing the shaft member 5 and rotor member 6 affixed on said shaft member 5 from disengaging from the bearing member 4 and at the same time forming the capillary seal part 12.

Moreover, a shallow dish-like member 19 is provided to cover another reduced diameter end 4e of bearing member 4, and a middle part 4f of the bearing member 4, having an enlarged diameter, is fitted on the cylindrical bearing holding part 3 of base member 2. The dish-shaped member 19 is fitted on the other reduced diameter end 4e by means of press-fitting, gluing, or the combination of them, or welding. Other than that, Embodiment 9 is identical to Embodiment 6.

Since Embodiment 9 is constituted as such, the annular member with a sleeve on bearing member side 14a and dish-like member 19 nearly completely prevent the lubricant from leaking from the lubricant filling parts to the outside. More specifically, lubricant leakage from the contact area between annular member with a sleeve on bearing member side 14a and bearing member 4 as well as from the contact area between the dish-like member 19 and the other end surface of the bearing member 4 is prevented.

Moreover, as the middle part with an enlarged diameter 4f is fitted on the cylindrical bearing holding part 3 of base member 2, it is possible to fit parts of higher precisions together, thus making it easier to hold the accuracy of the tilting of the shaft (shaft member 5) of motor 1 and improve the rotation accuracy further.

EMBODIMENT 10

The tenth embodiment (Embodiment 10) of the present invention will be described below.

FIG. 11 is a vertical cross section of a motor 1 of Embodiment 10. In Embodiment 10, the annular member on shaft member side 13 and shaft member 5 of Embodiment 9 are made of the same material as an integral part. Other than that, Embodiment 10 is identical to Embodiment 9 Since Embodiment 10 is constituted as such, it uses a smaller number of components, and thus can reduce the man-hours required for assembly.

The integral structure of the annular member on shaft member side 13 and shaft member 5 used in Embodiment 10 can be applied to all other embodiments where the annular member on shaft member side 13 is used.

EMBODIMENT 11

The eleventh embodiment (Embodiment 11) of the present invention will be described below.

FIGS. 18 (1) through (3) show various vertical cross sections of a portion of a motor of Embodiment 11. In Embodiment 11, a connecting passage 20 is formed to connect the capillary seal part 12 with the minute gap between the other end surface (bottom surface in FIG. 18) of the bearing member 4 and dish-like member 19, or the minute gap formed between the other end surface of the bearing member 4 and cylindrical member with a bottom 17.

The connecting passage 20 can be provided in the inside of bearing member 4 as shown in FIGS. 18 (1) and (2), or can be formed in such a way as to have a single or a plurality of grooves formed on the outer periphery surface of bearing member 4 in the axial direction. The groves are covered by the cylindrical member with a bottom 17 as shown in FIG. 18 (3). The connecting passage 20 shown in FIG. 18 (1) is formed close to the minute gap where the axial dynamic bearing 11 is formed, while the connecting passage 20 shown in FIG. 18 (2) is formed directly facing the starting area of the capillary seal part 12. Other features of this embodiment are identical to Embodiment 6 or Embodiment 9 depending on whether the cylindrical member with a bottom 17 is used or the dish-like member 19 is used.

Since Embodiment 11 is constituted as such, the reliability of the bearing can be improved. Air tends to remain in the minute gap between the other end surface (tip surface) of shaft member 5 and the cylindrical member with a bottom 17 or the dish-like member 19. Air also tends to remain in the minute gap between the other end surface of bearing member 4 and the cylindrical member with a bottom 17 or the dish-like member 19. This trapped air is vented to the outside through the communicating passage 20 and capillary seal part 12, and negative pressure generating regions are eliminated from the entire range of the lubricant filling part.

The communicating passage 20 in Embodiment 11 can be applied to all the embodiments where the dish-like member 19 or cylindrical member with a bottom 17 is used.

As to the constitutions of radial dynamic pressure bearing part 10 and axial dynamic pressure bearing part 11, various forms of embodiments are possible depending on the number of places where they are formed and the differences in the shapes of the dynamic grooves.

FIG. 12 and FIG. 13 are diagrams prepared for the convenience of comparing configurations of various types of embodiments of radial dynamic pressure bearing 10.

FIG. 12 shows various embodiments when radial dynamic pressure bearing 10 is provided in two locations in the axial direction. In the case of radial dynamic pressure bearing 10 of FIG. 12 (1), both the upper (in FIG. 12) radial dynamic pressure bearing 10a and the lower radial dynamic pressure bearing 10b have dynamic pressure grooves consisting of symmetric herringbone grooves, while the dynamic pressure grooves of the upper radial dynamic pressure bearing 10a are larger in physical size than the dynamic pressure grooves of the lower radial dynamic pressure bearing 10b.

In case of radial dynamic pressure bearing 10 of FIG. 12 (2), the upper radial dynamic pressure bearing 10a in FIG. 12 has dynamic pressure grooves consisting of asymmetric herringbone grooves, while the lower radial dynamic pressure bearing 10b has dynamic pressure grooves consisting of symmetric herringbone grooves. The dimensions of both dynamic pressure grooves are substantially identical to those of FIG. 12 (1).

In the case of radial dynamic pressure bearing 10 of FIG. 12 (3), both the upper radial dynamic pressure bearing 10a and the lower radial dynamic pressure bearing 10b in FIG. 12 have dynamic pressure grooves consisting of multi-arc grooves 21. The dynamic pressure grooves of the upper radial dynamic pressure bearing 10a are larger in physical size than the dynamic pressure grooves of the lower radial dynamic pressure bearing 10b. The dynamic pressure grooves consisting of multi-arc grooves 21 as shown in the plan view of the assembly of shaft member 5 and bearing member 4 included in FIG. 12 (3) consist of a plurality of grooves having multiple arcs in the cross section extending in the axial direction.

Next, FIG. 13 shows various embodiments when radial dynamic pressure bearing 10 is provided in only one location in the axial direction. Radial dynamic pressure bearing 10 of FIG. 13 (1) has dynamic pressure grooves consisting of symmetric herringbone grooves. Radial dynamic pressure bearing 10 of FIG. 13 (2) has dynamic pressure grooves consisting of asymmetric herringbone grooves, and radial dynamic pressure bearing 10 of FIG. 13 (3) has dynamic pressure grooves consisting of multi-arc grooves 21 (see FIG. 12 (3)).

FIG. 14 shows various embodiments of dynamic grooves used in axial dynamic pressure bearing 11. Dynamic pressure grooves of axial dynamic pressure bearing 11 shown in FIG. 14 (1) consist of spiral grooves. Dynamic pressure grooves of axial dynamic pressure bearing 11 shown in FIG. 14 (2) consist of symmetric herringbone grooves, and dynamic pressure grooves of axial dynamic pressure bearing 11 shown in FIG. 14 (3) consist of asymmetric herringbone grooves. In these drawings, the black areas represent the bottoms (valleys) of the grooves, while the white areas represent the hills.

FIG. 20 and FIG. 21 show various combinations of various dynamic pressure grooves used for radial and axial dynamic pressure bearings shown in FIG. 12 through FIG. 14. These are divided into cases in which radial dynamic bearing 10 is formed in two locations in the axial direction and cases in which radial dynamic bearing 10 is formed in only one location. A prototype fluid dynamic bearing mechanism for motor 1 with the seventh combination in FIG. 20 that has radial dynamic pressure bearing 10 provided in two locations on the shaft in axial direction was manufactured and tested and showed good rotation accuracy.

Annular member on the bearing member side 14 can also have various configurations. These variations have been described in Embodiments 1, 6, 8, and 9. FIGS. 16 (1) through (4) show these variations in an easily comparable format.

The blocking of the open end of bearing hole 4a of bearing member 4 can be configured in various ways. These variations have been described in Embodiments 1, 3, 6, 7, and 9. FIGS. 17 (1) through (5) show these variations in an easily comparable format.

Furthermore, shaft member 5 can also have various configurations. FIGS. 19 (1) through (6) show these variations in an easily comparable format. FIGS. 19 (1) through (3) show shafts of the types having a separating groove 5c for separating vertical radial dynamic pressure bearing 10a from 10b on the outer periphery surface of the middle section of shaft member 5. FIG. 19 (1) shows a shaft having a reduced diameter part 5b on one end of bearing member 5, where the annular member on shaft member side 13 is fitted. FIG. 19 (2) shows a straight shaft without reduced diameter part 5b. FIG. 19 (3) shows a shaft having the annular member on shaft member side 13 and shaft member 5 as an integrated piece.

Also, FIG. 19 (4) through (6) show shafts having no separating groove 5c for separating the vertical radial dynamic pressure bearing 10a from 10b on the outer periphery surface of the middle section of shaft member 5. Of these, FIG. 19 (4) shows a shaft having a reduced diameter part 5b on one end of bearing member 5, where the annular member on shaft member side 13 is fitted. FIG. 19 (5) shows a straight shaft having the same diameter for the entire length. FIG. 19 (6) shows a shaft having annular member on the shaft member side 13 and shaft member 5 as an integrated piece.

The present invention is not limited by the embodiments or examples shown above and can be modified within its basic parameters. While preferred embodiments of the invention have been described, various modifications will be apparent to one skilled in the art in light of this disclosure and are intended to fall within the scope of the appended claims.

We claim:

1. A fluid dynamic bearing mechanism for a motor, wherein a lubricant is continuously supplied into a minute gap formed between rotating parts and stationary parts, said minute gap including dynamic pressure grooves, and wherein a capillary seal part is formed at one end of the minute gap for preventing leakage of said lubricant, said fluid dynamic bearing mechanism comprising:
    a bearing member;
    a shaft member rotatably mounted in said bearing member;
    an annular member on the shaft member side mounted on said shaft member at a location corresponding to said capillary seal part;
    an annular member on the bearing member side mounted on said bearing member at a location corresponding to said capillary seal part;
    a taper or step formed on the outer periphery surface of said annular member on the shaft member side; and
    a taper or step being formed on the inner periphery surface of said annular member on the bearing member side;
    wherein the outer periphery surface of said annular member on the shaft member side and the inner periphery surface of said annular member on the bearing member side are arranged close to each other in the axial and radial directions to form said capillary seal part, and to preventing said rotating parts and said stationary parts from disengaging from each other.

2. The fluid dynamic bearing mechanism of claim 1, further comprising:
    dynamic pressure grooves formed either on the outer periphery surface of said shaft member or the inner periphery surface of said bearing member for generating dynamic pressure to support a radial load; and
    dynamic pressure grooves formed either on bottom surface of said annular member on the shaft member side or a surface of said bearing member opposing said bottom surface for generating dynamic pressure to support an axial load.

3. A fluid dynamic bearing mechanism of claim 1, wherein said annular member on the bearing member side is welded to said bearing member.

4. A fluid dynamic bearing mechanism of claim 1, wherein said annular member on the shaft side is made of quenched steel.

5. A fluid dynamic bearing mechanism of claim 1, wherein said annular member on the shaft side abuts the end surface of said rotor member, and thereby supports said rotor member in the axial direction.

6. The fluid dynamic bearing mechanism of claim 1, wherein an annular groove capable of alleviating boundary surface fluctuations of said lubricant in said capillary seal part is formed between said annular member on the shaft member side and said annular member on the bearing member side.

7. A fluid dynamic bearing mechanism of claim 1, further comprising:
    a rotor attached to said shaft member; and
    a plurality of lubricant supply ports formed on said rotor member, said supply ports opposing said capillary seal part in the axial direction.

8. A fluid dynamic bearing mechanism of claim 1, wherein said annular member on the shaft member side and said shaft member are produced from a single material as an integral piece.

9. A fluid dynamic bearing mechanism of claim 1, wherein said annular member on the bearing member side and said cylindrical member are produced from the same material as an integral piece.

10. A fluid dynamic bearing mechanism of claim 1, wherein said taper formed on the outer periphery surface of said annular member on the shaft member side and said taper formed on the inner periphery surface of said annular member on the bearing member side are formed in such a manner that the radial gap between them expands as it advances axially towards an end.

11. A fluid dynamic bearing mechanism of claim 1, wherein said step formed on the outer periphery surface of said annular member on the shaft side and said step formed on the inner periphery surface of said annular member on the bearing member side are formed in such a manner that the radial gap between one half outer periphery surface portion and one half inner periphery surface portion expands as it advances axially towards an end.

12. A fluid dynamic bearing mechanism for a motor, wherein a lubricant is continuously supplied into a minute gap formed between rotating parts and stationary parts, said minute gap including dynamic pressure grooves, and wherein a capillary seal part is formed at one end of the minute gap for preventing leakage of said lubricant, said fluid dynamic bearing mechanism comprising:
    a bearing member;

a shaft member rotatably mounted in said bearing member;
an annular member on the shaft member side mounted on said shaft member at a location corresponding to said capillary seal part;
an annular member on the bearing member side abutting an axial end of said bearing member at a location corresponding to said capillary seal part;
a cap-like cylindrical member with a bottom covering said bearing member and said annular member on the bearing member side, said annular member on the bearing member side being located at an open end of said cap-like cylindrical member with a bottom;
a taper or step formed on the outer periphery surface of said annular member on the shaft member side; and
a taper or step being formed on the inner periphery surface of said annular member on the bearing member side;
wherein the outer periphery surface of said annular member on the shaft member side and the inner periphery surface of said annular member on the bearing member side are arranged close to each other in the axial and radial directions to form said capillary seal part, and to preventing said rotating parts and said stationary parts from disengaging from each other.

13. The fluid dynamic bearing mechanism of claim 12, further comprising:
dynamic pressure grooves formed either on the outer periphery surface of said shaft member or the inner periphery surface of said bearing member for generating dynamic pressure to support a radial load; and
dynamic pressure grooves formed either on bottom surface of said annular member on the shaft member side or a surface of said bearing member opposing said bottom surface for generating dynamic pressure to support an axial load.

14. A fluid dynamic bearing mechanism of claim 12, wherein said annular member on the shaft side is made of quenched steel.

15. A fluid dynamic bearing mechanism of claim 12, wherein said annular member on the shaft side abuts the end surface of said rotor member, and thereby supports said rotor member in the axial direction.

16. The fluid dynamic bearing mechanism of claim 12, wherein an annular groove capable of alleviating boundary surface fluctuations of said lubricant in said capillary seal part is formed between said annular member on the shaft member side and said annular member on the bearing member side.

17. The fluid dynamic bearing mechanism of claim 12, wherein a connecting passage is formed to connect said capillary seal with a minute gap formed between an end surface of said bearing member and said cap like cylindrical member with a bottom.

18. A fluid dynamic bearing mechanism of claim 12, further comprising:
a rotor attached to said shaft member; and
a plurality of lubricant supply ports formed on said rotor member, said supply ports opposing said capillary seal part in the axial direction.

19. A fluid dynamic bearing mechanism of claim 12, wherein said annular member on the shaft member side and said shaft member are produced from a single material as an integral piece.

20. A fluid dynamic bearing mechanism of claim 12, wherein said annular member on the bearing member side and said cylindrical member are produced from the same material as an integral piece.

21. A fluid dynamic bearing mechanism of claim 12, wherein said taper formed on the outer periphery surface of said annular member on the shaft member side and said taper formed on the inner periphery surface of said annular member on the bearing member side are formed in such a manner that the radial gap between them expands as it advances axially towards an end.

22. A fluid dynamic bearing mechanism of claim 12, wherein said step formed on the outer periphery surface of said annular member on the shaft side and said step formed on the inner periphery surface of said annular member on the bearing member side are formed in such a manner that the radial gap between one half outer periphery surface portion and one half inner periphery surface portion expands as it advances axially towards an end.

23. A fluid dynamic bearing mechanism for a motor, wherein a lubricant is continuously supplied into a minute gap formed between rotating parts and stationary parts, said minute gap including dynamic pressure grooves, and wherein a capillary seal part is formed at one end of the minute gap for preventing leakage of said lubricant, said fluid dynamic bearing mechanism comprising:
a bearing member;
a reduced diameter end formed on said bearing member;
a shaft member rotatably mounted in said bearing member;
an annular member on the shaft member side mounted on said shaft member at a location corresponding to said capillary seal part;
an annular member with a sleeve on bearing member side having a sleeve part and an inner peripheral surface located corresponding to said capillary seal part, and said sleeve part being fitted on a reduced diameter end of said bearing member;
a shallow cap-type dish-like member being provided to cover the other diameter reducing end of said bearing member;
a taper or step formed on the outer periphery surface of said annular member on the shaft member side; and
a taper or step being formed on the inner peripheral surface of said annular member with a sleeve on bearing member side;
wherein the outer periphery surface of said annular member on the shaft member side and said inner peripheral surface of said annular member with a sleeve on the bearing member side are arranged close to each other in the axial and radial directions to form said capillary seal part, and to preventing said rotating parts and said stationary parts from disengaging from each other.

24. The fluid dynamic bearing mechanism of claim 23, further comprising:
dynamic pressure grooves formed either on the outer periphery surface of said shaft member or the inner periphery surface of said bearing member for generating dynamic pressure to support a radial load; and
dynamic pressure grooves formed either on bottom surface of said annular member on the shaft member side or a surface of said bearing member opposing said bottom surface for generating dynamic pressure to support an axial load.

25. A fluid dynamic bearing mechanism of claim 23, wherein said annular member on the shaft side is made of quenched steel.

26. A fluid dynamic bearing mechanism of claim 23, wherein said annular member on the shaft side abuts the end surface of said rotor member, and thereby supports said rotor member in the axial direction.

27. A fluid dynamic bearing mechanism of claim 23, further comprising:
a rotor attached to said shaft member; and a plurality of lubricant supply ports formed on said rotor member, said supply ports opposing said capillary seal part in the axial direction.

28. A fluid dynamic bearing mechanism of claim 23, wherein said annular member on the shaft member side and said shaft member are produced from a single material as an integral piece.

29. The fluid dynamic bearing mechanism of claim 23, further comprising:
a middle part with an enlarged diameter formed on said bearing member, said middle part with an enlarged diameter being fitted on a cylindrical bearing holding part of a base member of said fluid dynamic bearing.

30. The fluid dynamic bearing mechanism of claim 23, wherein an annular groove capable of alleviating boundary surface fluctuations of said lubricant in said capillary seal part is formed between said annular member on the shaft member side and said annular member with a sleeve on the bearing member side.

31. The fluid dynamic bearing mechanism of claim 23, wherein a connecting passage is formed to connect said capillary seal with the minute gap formed between an end surface of said bearing member and said shallow cap-type dish-like member.

32. A fluid dynamic bearing mechanism of claim 23, wherein said annular member on the bearing member side and said cylindrical member are produced from the same material as an integral piece.

33. A fluid dynamic bearing mechanism of claim 23, wherein said taper formed on the outer periphery surface of said annular member on the shaft member side and said taper formed on the inner periphery surface of said annular member with a sleeve on the bearing member side are formed in such a manner that the radial gap between them expands as it advances axially towards an end.

34. A fluid dynamic bearing mechanism of claim 23, wherein said step formed on the outer periphery surface of said annular member on the shaft side and said step formed on the inner periphery surface of said annular member with a sleeve on the bearing member side are formed in such a manner that the radial gap between one half outer periphery surface portion and one half inner periphery surface portion expands as it advances axially towards an end.

35. A fluid dynamic bearing mechanism for a motor, wherein a lubricant is continuously supplied into a minute gap formed between rotating parts and stationary parts, said minute gap including dynamic pressure grooves, and wherein a capillary seal part is formed at one end of the minute gap for preventing leakage of said lubricant, said fluid dynamic bearing mechanism comprising:
a bearing member;
a shaft member rotatably mounted in said bearing member;
an annular member on the shaft member side mounted on said shaft member at a location corresponding to said capillary seal part;
an annular member on the bearing member side abutting an axial end surface of said bearing member at a location corresponding to said capillary seal part;
a cylindrical member covering said bearing member and said annular member on the bearing member side;
a cover plate fitted on an opening on an end of said cylindrical member, thus blocking an open end of a bearing hole of said bearing member;
a taper or step formed on the outer periphery surface of said annular member on the shaft member side; and
a taper or step being formed on the inner periphery surface of said annular member on the bearing member side;
wherein the outer periphery surface of said annular member on the shaft member side and the inner periphery surface of said annular member on the bearing member side are arranged close to each other in the axial and radial directions to form said capillary seal part, and to preventing said rotating parts and said stationary parts from disengaging from each other.

36. The fluid dynamic bearing mechanism of claim 35, further comprising:
dynamic pressure grooves formed either on the outer periphery surface of said shaft member or the inner periphery surface of said bearing member for generating dynamic pressure to support a radial load; and
dynamic pressure grooves formed either on bottom surface of said annular member on the shaft member side or a surface of said bearing member opposing said bottom surface for generating dynamic pressure to support an axial load.

37. A fluid dynamic bearing mechanism of claim 35, wherein said annular member on the shaft side is made of quenched steel.

38. A fluid dynamic bearing mechanism of claim 35, wherein said annular member on the shaft side abuts the end surface of said rotor member, and thereby supports said rotor member in the axial direction.

39. A fluid dynamic bearing mechanism of claim 35, further comprising:
a rotor attached to said shaft member; and
a plurality of lubricant supply ports formed on said rotor member, said supply ports opposing said capillary seal part in the axial direction.

40. A fluid dynamic bearing mechanism of claim 35, wherein said annular member on the shaft member side and said shaft member are produced from a single material as an integral piece.

41. A fluid dynamic bearing mechanism of claim 35, wherein said annular member on the bearing member side and said cylindrical member are produced from the same material as an integral piece.

42. A fluid dynamic bearing mechanism of claim 35, wherein said taper formed on the outer periphery surface of said annular member on the shaft member side and said taper formed on the inner periphery surface of said annular member on the bearing member side are formed in such a manner that the radial gap between them expands as it advances axially towards an end.

43. A fluid dynamic bearing mechanism of claim 35, wherein said step formed on the outer periphery surface of said annular member on the shaft side and said step formed on the inner periphery surface of said annular member on the bearing member side are formed in such a manner that the radial gap between one half outer periphery surface portion and one half inner periphery surface portion expands as it advances axially towards an end.

44. The fluid dynamic bearing mechanism of claim 35, wherein an annular groove capable of alleviating boundary surface fluctuations of said lubricant in said capillary seal part is formed between said annular member on the shaft member side and said annular member on the bearing member side.

45. A hard disk drive comprising:
a motor, the motor having
a stator;
a rotor mounted on the stator;
a flange formed on the rotor;
a disk mounted on the flange; and
a fluid dynamic bearing mechanism wherein a lubricant is continuously supplied into a minute gap formed between rotating parts and stationary parts, said minute gap including dynamic pressure grooves, and wherein a capillary seal part is formed at one end of the minute gap for preventing leakage of said lubricant, said fluid dynamic bearing mechanism comprising:
a bearing member;
a shaft member rotatably mounted in said bearing member;
an annular member on the shaft member side mounted on said shaft member at a location corresponding to said capillary seal part;
an annular member on the bearing member side mounted on said bearing member at a location corresponding to said capillary seal part;
a taper or step formed on the outer periphery surface of said annular member on the shaft member side; and
a taper or step being formed on the inner periphery surface of said annular member on the bearing member side;
wherein the outer periphery surface of said annular member on the shaft member side and the inner periphery surface of said annular member on the bearing member side are arranged close to each other in the axial and radial directions to form said capillary seal part, and to preventing said rotating parts and said stationary parts from disengaging from each other.

46. The hard disk drive of claim 45 wherein the disk is chosen from a group consisting of a magnetic disk and an optical disk.

47. The hard disk drive of claim 46, further comprising:
dynamic pressure grooves formed either on the outer periphery surface of said shaft member or the inner periphery surface of said bearing member for generating dynamic pressure to support a radial load; and
dynamic pressure grooves formed either on bottom surface of said annular member on the shaft member side or a surface of said bearing member opposing said bottom surface for generating dynamic pressure to support an axial load.

48. The hard disk drive of claim 46, wherein said annular member on the bearing member side is welded to said bearing member.

49. The hard disk drive of claim 46, wherein said annular member on the shaft side is made of quenched steel.

50. The hard disk drive of claim 46, wherein said annular member on the shaft side abuts the end surface of said rotor member, and thereby supports said rotor member in the axial direction.

51. The hard disk drive of claim 46, wherein an annular groove capable of alleviating boundary surface fluctuations of said lubricant in said capillary seal part is formed between said annular member on the shaft member side and said annular member on the bearing member side.

52. The hard disk drive of claim 46, further comprising:
a rotor attached to said shaft member; and
a plurality of lubricant supply ports formed on said rotor member, said supply ports opposing said capillary seal part in the axial direction.

53. The hard disk drive of claim 46, wherein said annular member on the shaft member side and said shaft member are produced from a single material as an integral piece.

54. The hard disk drive of claim 46, wherein said annular member on the bearing member side and said cylindrical member are produced from the same material as an integral piece.

55. The hard disk drive of claim 46, wherein said taper formed on the outer periphery surface of said annular member on the shaft member side and said taper formed on the inner periphery surface of said annular member on the bearing member side are formed in such a manner that the radial gap between them expands as it advances axially towards an end.

56. The hard disk drive of claim 46, wherein said step formed on the outer periphery surface of said annular member on the shaft side and said step formed on the inner periphery surface of said annular member on the bearing member side are formed in such a manner that the radial gap between one half outer periphery surface portion and one half inner periphery surface portion expands as it advances axially towards an end.

57. A hard disk drive comprising:
a motor, the motor having
a stator;
a rotor mounted on the stator;
a flange formed on the rotor;
a disk mounted on the flange;
a fluid dynamic bearing mechanism wherein a lubricant is continuously supplied into a minute gap formed between rotating parts and stationary parts, said minute gap including dynamic pressure grooves, and wherein a capillary seal part is formed at one end of the minute gap for preventing leakage of said lubricant, said fluid dynamic bearing mechanism comprising:
a bearing member;
a shaft member rotatably mounted in said bearing member;
an annular member on the shaft member side mounted on said shaft member at a location corresponding to said capillary seal part;
an annular member on the bearing member side abutting an axial end of said bearing member at a location corresponding to said capillary seal part;
a cap-like cylindrical member with a bottom covering said bearing member and said annular member on the bearing member side, said annular member on the bearing member side being located at an open end of said cap-like cylindrical member with a bottom;
a taper or step formed on the outer periphery surface of said annular member on the shaft member side; and
a taper or step being formed on the inner periphery surface of said annular member on the bearing member side;
wherein the outer periphery surface of said annular member on the shaft member side and the inner periphery surface of said annular member on the bearing member side are arranged close to each other in the axial and radial directions to form said capillary seal part, and to preventing said rotating parts and said stationary parts from disengaging from each other.

58. The hard disk drive of claim 57 wherein the disk is chosen from a group consisting of a magnetic disk and an optical disk.

59. The hard disk drive of claim 58, further comprising:
dynamic pressure grooves formed either on the outer periphery surface of said shaft member or the inner periphery surface of said bearing member for generating dynamic pressure to support a radial load; and
dynamic pressure grooves formed either on bottom surface of said annular member on the shaft member side or a surface of said bearing member opposing said bottom surface for generating dynamic pressure to support an axial load.

60. The hard disk drive of claim 58, wherein said annular member on the shaft side is made of quenched steel.

61. The hard disk drive of claim 58, wherein said annular member on the shaft side abuts the end surface of said rotor member, and thereby supports said rotor member in the axial direction.

62. The hard disk drive of claim 58, wherein an annular groove capable of alleviating boundary surface fluctuations of said lubricant in said capillary seal part is formed between said annular member on the shaft member side and said annular member on the bearing member side.

63. The hard disk drive of claim 58, wherein a connecting passage is formed to connect said capillary seal with a minute gap formed between an end surface of said bearing member and said cap like cylindrical member with a bottom.

64. The hard disk drive of claim 58, further comprising:
a rotor attached to said shaft member; and
a plurality of lubricant supply ports formed on said rotor member, said supply ports opposing said capillary seal part in the axial direction.

65. The hard disk drive of claim 58, wherein said annular member on the shaft member side and said shaft member are produced from a single material as an integral piece.

66. The hard disk drive of claim 58, wherein said annular member on the bearing member side and said cylindrical member are produced from the same material as an integral piece.

67. The hard disk drive of claim 58, wherein said taper formed on the outer periphery surface of said annular member on the shaft member side and said taper formed on the inner periphery surface of said annular member on the bearing member side are formed in such a manner that the radial gap between them expands as it advances axially towards an end.

68. The hard disk drive of claim 58, wherein said step formed on the outer periphery surface of said annular member on the shaft side and said step formed on the inner periphery surface of said annular member on the bearing member side are formed in such a manner that the radial gap between one half outer periphery surface portion and one half inner periphery surface portion expands as it advances axially towards an end.

69. A hard disk drive comprising:
a motor, the motor having
a stator;
a rotor mounted on the stator;
a flange formed on the rotor;
a disk mounted on the flange;
a fluid dynamic bearing mechanism wherein a lubricant is continuously supplied into a minute gap formed between rotating parts and stationary parts, said minute gap including dynamic pressure grooves, and wherein a capillary seal part is formed at one end of the minute gap for preventing leakage of said lubricant, said fluid dynamic bearing mechanism comprising:
a bearing member;
a reduced diameter end formed on said bearing member;
a shaft member rotatably mounted in said bearing member;
an annular member on the shaft member side mounted on said shaft member at a location corresponding to said capillary seal part;
an annular member with a sleeve on bearing member side having a sleeve part and an inner peripheral surface located corresponding to said capillary seal part, and said sleeve part being fitted on a reduced diameter end of said bearing member;
a shallow cap-type dish-like member being provided to cover the other diameter reducing end of said bearing member;
a taper or step formed on the outer periphery surface of said annular member on the shaft member side; and
a taper or step being formed on the inner peripheral surface of said annular member with a sleeve on bearing member side;
wherein the outer periphery surface of said annular member on the shaft member side and said inner peripheral surface of said annular member with a sleeve on the bearing member side are arranged close to each other in the axial and radial directions to form said capillary seal part, and to preventing said rotating parts and said stationary parts from disengaging from each other.

70. The hard disk drive of claim 69 wherein the disk is chosen from a group consisting of a magnetic disk and an optical disk.

71. The hard disk drive of claim 70, further comprising:
dynamic pressure grooves formed either on the outer periphery surface of said shaft member or the inner periphery surface of said bearing member for generating dynamic pressure to support a radial load; and
dynamic pressure grooves formed either on bottom surface of said annular member on the shaft member side or a surface of said bearing member opposing said bottom surface for generating dynamic pressure to support an axial load.

72. The hard disk drive of claim 70, wherein said annular member on the shaft side is made of quenched steel.

73. The hard disk drive of claim 70, wherein said annular member on the shaft side abuts the end surface of said rotor member, and thereby supports said rotor member in the axial direction.

74. The hard disk drive of claim 70, further comprising:
a rotor attached to said shaft member; and
a plurality of lubricant supply ports formed on said rotor member, said supply ports opposing said capillary seal part in the axial direction.

75. The hard disk drive of claim 70, wherein said annular member on the shaft member side and said shaft member are produced from a single material as an integral piece.

76. The hard disk drive of claim 70, further comprising:
a middle part with an enlarged diameter formed on said bearing member, said middle part with an enlarged diameter being fitted on a cylindrical bearing holding part of a base member of said fluid dynamic bearing.

77. The hard disk drive of claim 70, wherein an annular groove capable of alleviating boundary surface fluctuations of said lubricant in said capillary seal part is formed between said annular member on the shaft member side and said annular member with a sleeve on the bearing member side.

78. The hard disk drive of claim 70, wherein a connecting passage is formed to connect said capillary seal with the minute gap formed between an end surface of said bearing member and said shallow cap-type dish-like member.

79. The hard disk drive of claim 70, wherein said annular member on the bearing member side and said cylindrical member are produced from the same material as an integral piece.

80. The hard disk drive of claim 70, wherein said taper formed on the outer periphery surface of said annular member on the shaft member side and said taper formed on the inner periphery surface of said annular member with a sleeve on the bearing member side are formed in such a manner that the radial gap between them expands as it advances axially towards an end.

81. The hard disk drive of claim 70, wherein said step formed on the outer periphery surface of said annular member on the shaft side and said step formed on the inner periphery surface of said annular member with a sleeve on the bearing member side are formed in such a manner that the radial gap between one half outer periphery surface portion and one half inner periphery surface portion expands as it advances axially towards an end.

82. A hard disk drive comprising:
a motor, the motor having
a stator;
a rotor mounted on the stator;
a flange formed on the rotor;
a disk mounted on the flange;
a fluid dynamic bearing mechanism wherein a lubricant is continuously supplied into a minute gap formed between rotating parts and stationary parts, said minute gap including dynamic pressure grooves, and wherein a capillary seal part is formed at one end of the minute gap for preventing leakage of said lubricant, said fluid dynamic bearing mechanism comprising:
a bearing member;
a shaft member rotatably mounted in said bearing member;
an annular member on the shaft member side mounted on said shaft member at a location corresponding to said capillary seal part;
an annular member on the bearing member side abutting an axial end surface of said bearing member at a location corresponding to said capillary seal part;
a cylindrical member covering said bearing member and said annular member on the bearing member side;
a cover plate fitted on an opening on an end of said cylindrical member, thus blocking an open end of a bearing hole of said bearing member;
a taper or step formed on the outer periphery surface of said annular member on the shaft member side; and
a taper or step being formed on the inner periphery surface of said annular member on the bearing member side;
wherein the outer periphery surface of said annular member on the shaft member side and the inner periphery surface of said annular member on the bearing member side are arranged close to each other in the axial and radial directions to form said capillary seal part, and to preventing said rotating parts and said stationary parts from disengaging from each other.

83. The hard disk drive of claim 82 wherein the disk is chosen from a group consisting of a magnetic disk and an optical disk.

84. The hard disk drive of claim 83, further comprising:
dynamic pressure grooves formed either on the outer periphery surface of said shaft member or the inner periphery surface of said bearing member for generating dynamic pressure to support a radial load; and
dynamic pressure grooves formed either on bottom surface of said annular member on the shaft member side or a surface of said bearing member opposing said bottom surface for generating dynamic pressure to support an axial load.

85. The hard disk drive of claim 83, wherein said annular member on the shaft side is made of quenched steel.

86. The hard disk drive of claim 83, wherein said annular member on the shaft side abuts the end surface of said rotor member, and thereby supports said rotor member in the axial direction.

87. The hard disk drive of claim 83, further comprising:
a rotor attached to said shaft member; and
a plurality of lubricant supply ports formed on said rotor member, said supply ports opposing said capillary seal part in the axial direction.

88. The hard disk drive of claim 83, wherein said annular member on the shaft member side and said shaft member are produced from a single material as an integral piece.

89. The hard disk drive of claim 83, wherein said annular member on the bearing member side and said cylindrical member are produced from the same material as an integral piece.

90. The hard disk drive of claim 83, wherein said taper formed on the outer periphery surface of said annular member on the shaft member side and said taper formed on the inner periphery surface of said annular member on the bearing member side are formed in such a manner that the radial gap between them expands as it advances axially towards an end.

91. The hard disk drive of claim 83, wherein said step formed on the outer periphery surface of said annular member on the shaft side and said step formed on the inner periphery surface of said annular member on the bearing member side are formed in such a manner that the radial gap between one half outer periphery surface portion and one half inner periphery surface portion expands as it advances axially towards an end.

92. The hard disk drive of claim 83, wherein an annular groove capable of alleviating boundary surface fluctuations of said lubricant in said capillary seal part is formed between said annular member on the shaft member side and said annular member on the bearing member side.

* * * * *